(12) United States Patent
Hu et al.

(10) Patent No.: US 11,578,894 B2
(45) Date of Patent: Feb. 14, 2023

(54) WOOD-BASED SOLAR THERMAL DEVICES, AND METHODS FOR FABRICATION AND USE THEREOF

(71) Applicant: University of Maryland, College Park, College Park, MD (US)

(72) Inventors: Liangbing Hu, Potomac, MD (US); Mingwei Zhu, Nanjing (CN); Yiju Li, Beijing (CN); Chaoji Chen, Hyattsville, MD (US); Tian Li, Indianapolis, IN (US); He Liu, Nanjing (CN); Amy Gong, Potomac, MD (US); Yudi Kuang, Greenbelt, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 17/029,414

(22) Filed: Sep. 23, 2020

(65) Prior Publication Data
US 2021/0088252 A1 Mar. 25, 2021

Related U.S. Application Data

(62) Division of application No. 16/002,796, filed on Jun. 7, 2018, now abandoned.
(Continued)

(51) Int. Cl.
*F24S 10/80* (2018.01)
*F04B 17/00* (2006.01)
(Continued)

(52) U.S. Cl.
CPC ............ *F24S 10/80* (2018.05); *B01D 1/0005* (2013.01); *B01D 1/0035* (2013.01); *B01D 5/006* (2013.01);
(Continued)

(58) Field of Classification Search
CPC .. F24S 10/80; F24S 10/90; F24S 10/95; F24S 70/10; B01D 1/0005; B01D 1/0035;
(Continued)

(56) References Cited

U.S. PATENT DOCUMENTS

| | | |
|---|---|---|
| 2,123,409 A | 7/1938 | Armin |
| 3,159,554 A | 12/1964 | Mount |

(Continued)

FOREIGN PATENT DOCUMENTS

| | | |
|---|---|---|
| CA | 1066697 A | 11/1979 |
| CN | 105002232 A | 10/2015 |

(Continued)

OTHER PUBLICATIONS

Guobin Xue, Robust and Low-Cost Flame-Treated Wood for High-Performance Solar Steam Generation (Year: 2017).*

(Continued)

*Primary Examiner* — Nam X Nguyen
*Assistant Examiner* — Ekandra S. Miller-Cruz
(74) *Attorney, Agent, or Firm* — RowanTree Law Group, PLLC; Frederick F. Rosenberger

(57) ABSTRACT

Solar thermal devices are formed from a block of wood, where the natural cell lumens of the wood form an interconnected network that transports fluid or material therein. The block of wood can be modified to increase absorption of solar radiation. Combining the solar absorption effects with the natural transport network can be used for various applications. In some embodiments, heating of the modified block of wood by insolation can be used to evaporate a fluid, for example, evaporating water for extraction, distillation, or desalination. In other embodiments, heating of the modified block of wood by insolation can be used to change transport properties of a material to allow it to be transported in the (Continued)

interconnected network, for example, heating crude oil to adsorb the oil within the block of wood.

8 Claims, 14 Drawing Sheets

Related U.S. Application Data

(60) Provisional application No. 62/517,595, filed on Jun. 9, 2017.

(51) Int. Cl.

| | |
|---|---|
| B01D 17/04 | (2006.01) |
| C02F 1/28 | (2006.01) |
| E02B 15/10 | (2006.01) |
| C02F 101/32 | (2006.01) |
| C02F 103/36 | (2006.01) |
| C02F 1/14 | (2023.01) |
| C02F 1/04 | (2023.01) |
| B01D 1/00 | (2006.01) |
| B05D 7/06 | (2006.01) |
| F04B 19/00 | (2006.01) |
| F24S 10/95 | (2018.01) |
| F24S 10/90 | (2018.01) |
| B01D 5/00 | (2006.01) |
| F24S 70/10 | (2018.01) |
| F04B 19/16 | (2006.01) |
| C02F 103/08 | (2006.01) |
| C02F 103/00 | (2006.01) |

(52) U.S. Cl.
CPC ............ B01D 17/042 (2013.01); B05D 7/06 (2013.01); C02F 1/043 (2013.01); C02F 1/14 (2013.01); C02F 1/283 (2013.01); E02B 15/101 (2013.01); F04B 17/006 (2013.01); F04B 19/006 (2013.01); F04B 19/16 (2013.01); F24S 10/90 (2018.05); F24S 10/95 (2018.05); F24S 70/10 (2018.05); C02F 2101/32 (2013.01); C02F 2103/007 (2013.01); C02F 2103/08 (2013.01); C02F 2103/365 (2013.01)

(58) Field of Classification Search
CPC ........ B01D 5/006; B01D 17/042; B05D 7/06; C02F 1/043; C02F 1/14; C02F 1/283; C02F 2101/32; C02F 2103/007; C02F 2103/08; C02F 2103/365; E02B 15/101; F04B 17/006; F04B 19/006; F04B 19/16; Y02A 20/124; Y02A 20/142; Y02A 20/212; Y02E 10/44; F24J 70/00; F24J 70/10; F24J 208/017; B27M 1/00; B27M 1/003; B27M 1/08; B27M 3/00; B27M 3/006
USPC .................. 210/694, 693, 671, 680, 242.4
See application file for complete search history.

(56) References Cited

U.S. PATENT DOCUMENTS

| | | | |
|---|---|---|---|
| 4,858,399 A | 8/1989 | Salato, Jr. | |
| 4,908,099 A | 3/1990 | DeLong | |
| 5,188,707 A | 2/1993 | Gordy | |
| 5,632,123 A | 5/1997 | Erwin | |
| 7,008,515 B1 | 3/2006 | Husson, Jr. et al. | |
| 9,138,965 B2 | 9/2015 | Hu et al. | |
| 9,174,355 B2 | 11/2015 | Rector et al. | |
| 2005/0008530 A1 | 1/2005 | Caserta et al. | |
| 2007/0029246 A1* | 2/2007 | Ueda | B01J 20/3042 210/263 |
| 2008/0146701 A1 | 6/2008 | Sain et al. | |
| 2008/0186801 A1 | 8/2008 | Liu et al. | |
| 2017/0043497 A1 | 2/2017 | Burgert et al. | |

FOREIGN PATENT DOCUMENTS

| | | |
|---|---|---|
| WO | WO 1991/001409 A1 | 2/1991 |
| WO | WO 2016/141432 A1 | 9/2016 |
| WO | WO 2017/136714 A1 | 8/2017 |
| WO | WO 2018/187238 A1 | 10/2018 |
| WO | WO 2018/191181 A1 | 10/2018 |

OTHER PUBLICATIONS

Abstract for Yano et al., "High Strength Wood-based Materials," *Cellulose Communications*, 2003, 10(1) pp. 22-27. (6 pages).
Abstract only for Jiang et al., "Bilayered biofoam for highly efficient solar steam generation," *Advanced Materials*, Nov. 2016, 28(42): pp. 9400-9407. (2 pages).
Abstract only for Lee et al., "Nanostructure and surface composition of Pt and Ru binary catalysts on polyaniline-functionalized carbon nanotubes," *Langmuir*, Oct. 2011, 27(23): pp. 14654-14661. (2 pages).
Abstract only for Liu et al., "A bioinspired, reusable, paper-based system for high-performance large-scale evaporation," *Advanced Materials*, May 2015, 27(17): pp. 2768-2774. (1 page).
Abstract only for Solar et al., "Alkaline and Akaline/Oxidation Pre-Treatments of Spruce Wood. Part 1: Chemical Alterations of Wood and its Digestibility under Conditions of Kraft Cook," *Wood Research*, Jan. 2009, 54(4): pp. 1-12. (2 pages).
Ali et al., "The structure and mechanics of nanofibrillar cellulose foams," *Soft Matter*, 2013, 9: pp. 1580-1588. (9 pages).
Blanchette et al., "Changes in structural and chemical components of wood delignified by fungi," *Wood Sci. Technol.*, 1985, 19: pp. 35-46. (12 pages).
Burgert et al., "Bio-inspired functional wood-based materials—hybrids and replicates," *International Materials Reviews*, 2015, 60(8): pp. 431-450. (21 pages).
Chen et al., "All-wood, low tortuosity, aqueous, biodegradable supercapacitors with ultra-high capacitance," *Energy & Environmental Science*, 2017, 10: pp. 538-545. (8 pages).
Chen et al., "Scalable and Sustainable Approach toward Highly Compressible, Anisotropic, Lamellar Carbon Sponge," *Chem*, 2018, 4: pp. 544-554. (12 pages).
Chen et al., "Thermal behavior of extracted and delignified pine wood flour," *Thermochimica Acta*, 2014, 591: pp. 40-44. (5 pages).
Deville et al., "Freezing as a Path to Build Complex Composites," *Science*, 2006, 311 (5760): pp. 515-518. (6 pages).
Dutkova et al., "Mechanochemically synthesized CuFeSe2 nanoparticles and their properties," *Acta Physica Polonica A*, Apr. 2017, 131(4): pp. 1156-1158. (3 pages).
Fang et al., "Densification of wood veneers by compression combined with heat and steam," *Eur. J. Wood Prod.*, 2012, 70: pp. 155-163. (9 pages).
Fratzl, P., "Wood made denser and stronger," *Nature*, Feb. 2018, 554: pp. 172-173. (2 pages).
Fu et al., "Nanostructured Wood Hybrids for Fire-Retardancy Prepared by Clay Impregnation into the Cell Wall," *Applied Materials & Interfaces*, 2017, 9: pp. 36154-36163. (10 pages).
Ghosh, S.C., "Wood modification with functionalized poly dimethylsiloxanes," Dissertation, University of Gottingen, 2009, pp. 1-15. (16 pages).
Guan et al., "Highly Compressible Wood Sponges with a Spring-like Lamellar Structure as Effective and Reusable Oil Absorbents," *ACS Nano*, 2018, 12: pp. 10365-10373. (9 pages).
Guo et al., "Anisotropic thermal transport in highly ordered $TiO_2$ nanotube arrays," *Journal of Applied Physics*, 2009, 106: 123526. (7 pages).
He et al., "An Energy-Efficient, Wood-Derived Structural Material Enabled by Pore Structure Engineering towards Building Efficiency," *Small Methods*, 2020, 4:1900747. (8 pages).

(56) References Cited

OTHER PUBLICATIONS

He et al., "Impacts of Limestone Particle Size on the Performance of Flexible Wood Fiber Composite Floor," *Advances in Materials Science and Engineering*, 2015. (6 pages).

Ilyas et al., "Effect of Delignification on the Physical, Thermal, Chemical, and Structural Properties of Sugar Palm Fibre," *BioResources*, 2017, 12(4): 8734-54. (21 pages).

Jakes et al., "Wood as inspiration for new stimuli-responsive structures and materials," *Bioinspiration, Biomimetics, and Bioreplication*, International Society for Optics and Photonics, Mar. 2014, 9055:90550K. (13 pages).

Jia et al., "Scalable, anisotropic transparent paper directly from wood for light management in solar cells," *Nano Energy*, 2017, 36: pp. 366-373. (8 pages).

Lee et al., "Wearable textile battery rechargeable by solar energy," *Nano Letters*, Oct. 2013, 13(11): pp. 5753-5761. (9 pages).

Li et al., "Anisotropic, lightweight, strong, and super thermally insulating nanowood with naturally aligned nanocellulose," *Sci. Adv.*, 2018, 4: eaar3724. (10 pages).

Li et al., "Lignin-Retaining Transparent Wood," *ChemSusChem*, 2017, 10: pp. 3445-3451. (7 pages).

Li et al., "Luminescent Transparent Wood," *Advanced Optical Materials*, 2016, 5:1600834. (5 pages).

Li et al., "Optically transparent wood from a nanoporous cellulosic template: Combining functional and structural performance," *Biomacromolecules*, Mar. 2016, 17(4): pp. 1358-1364. (7 pages).

Li et al., "Strong and superhydrophobic wood with aligned cellulose nanofibers as a waterproof structural material," *Chinese Journal of Chemistry*, 2020, 38(8): pp. 823-829. (7 pages).

Li et al., "Towards centimeter thick transparent wood through interface manipulation," *Journal of Materials Chemistry A*, 2018, 6: 1094-1101. (8 pages).

Li et al., "Wood Composite as an Energy Efficient Building Material: Guided Sunlight Transmittance and Effective Thermal Insulation," *Advanced Energy Materials*, 2016, 6: 1601122. (7 pages).

Li et al., "Wood-Polymer Composites Prepared by the In Situ Polymerization of Monomers Within Wood," *Journal of Applied Polymer Science*, 2011, 119: pp. 3207-3216. (10 pages).

Lv et al., "Eco-friendly wood-based solid-state flexible supercapacitors from wood transverse section slice and reduced graphene oxide," *Electronic Materials Letters*, Jul. 2015, 11(4): pp. 633-642. (10 pages).

Lv et al., "Novel wood-based all-solid-state flexible supercapacitors fabricated with a natural porous wood slice and polypyrrole," *RSC Adv.*, 2015, 5: pp. 2813-2818. (6 pages).

Rekola, J., "Wood as a Model Material for Medical Biomaterials," Dissertation, Institute of Dentistry, Biomaterials Science and Department of Otorhinolaryngology and Head and Neck Surgery, University of Turku, Turku, Finland, 2011. (94 pages).

Ruel et al., "The wood cell wall at the ultrastructural scale—formation and topochemical organization," *Maderas. Ciencia y tecnologia*, 2006, 8(2): pp. 107-116. (10 pages).

Sacui et al., "Comparison of the Properties of Cellulose Nanocrystals and Cellulose Nanofibrils Isolated from Bacteria, Tunicate, and Wood Processed Using Acid, Enzymatic, Mechanical, and Oxidative Methods," *ACS Applied Materials & Interfaces*, 2014, 6: pp. 6127-6138. (12 pages).

Shams et al., "Compressive deformation of wood impregnated with low molecular weight phenol formaldehyde (PF) resin III: effects of sodium chlorite treatment," *J. Wood Sci*, 2005, 51: pp. 234-238. (5 pages).

Song et al., "Highly Compressible, Anisotropic Aerogel with Aligned Cellulose Nanofibers," *ACS Nano*, Dec. 2017, 12: pp. 140-147. (8 pages).

Tampieri et al., "From wood to bone: multi-step process to convert wood hierarchical structures into biomimetic hydroxyapatite scaffolds for bone tissue engineering," *Journal of Materials Chemistry*, Jun. 2009, 19(28): pp. 4973-4980. (8 pages).

White, R. H., "Effect of lignin content and extractives on the higher heating value of wood," *Wood Fiber Sci.*, Oct. 1987, 19(4): pp. 446-452. (7 pages).

Yu et al., "Transparent wood containing $Cs_xWO_3$ nanoparticles for heat-shielding window applications," *Journal of Materials Chemistry A*, 2017, 5: pp. 6019-6024. (6 pages).

Zarrinmehr et al., "Interlocked archimedean spirals for conversion of planar rigid panels into locally flexible panels with stiffness control," *Computers & Graphics*, 2017, 66: pp. 93-102. (10 pages).

Zhang et al., "High-capacity, low-tortuosity, and channel-guided lithium metal anode," *Proceedings of the National Academy of Sciences*, Mar. 2017, 114(14): pp. 3584-59. (6 pages).

Zhu et al., "Anisotropic, transparent films with aligned cellulose nanofibers," *Advanced Materials*, 2017, 29: 1606284. (8 pages).

Zhu et al., "Highly Anisotropic, Highly Transparent Wood Composites," *Advanced Materials*, 2016, 28: pp. 5181-5187. (7 pages).

Zhu et al., "Integrated production of nano-fibrillated cellulose and cellulosic biofuel (ethanol) by enzymatic fractionation of wood fibers," *Green Chemistry*, 2011, 13: pp. 1339-1344. (6 pages).

Zhu et al., "Transparent and haze wood composites for highly efficient broadband light management in solar cells," *Nano Energy*, 2016, 26: pp. 332-339. (8 pages).

Zhu et al., "Wood-Derived Materials for Green Electronics, Biological Devices, and Energy Applications," *Chemical Reviews*, 2016, 116: pp. 9305-9374. (70 pages).

"Capillary Action and water," USGS, available online at: https://www.usgs.gov/special-topic/water-science-school/science/capillary-action-and-water?qt-science_center_objects=0#qt-science_center_objects.

Chen et al. "Highly flexible and efficient solar steam generation device," *Advanced Materials*, 2017, 29(30): 1701756. 8 pages.

Crump, "2×4 lumber for construction"—Image ID: FF06N 1, Alamy Stock Photo, Jun. 23, 2008, URL: https://www.alamy.com/stock-photo-2×4-lumber-for-construction-95276973.html?pv=1&stamp=2&imageid=A8550D42-3E6C-4728-AE23-8015E1BE2003&p=283185&n=0&orientation =0&pn =1&searchtype=0&1sFromSearch=1&srch=foo%0Dbar%26st%3D0%26.

Goncalves et al., "The effect of carbonization on wood structure of Dalbergia Violacea, Stryphnodendron Polyphyllum, Tapirira Guianensis, Vochysia Tucanorum, and Pouteria Torta from the Brazilian Cerrado," *IAWA Journal*, International Association of Wood Anatomist, Jan. 2012, 33(1): pp. 73-90.

Inagaki et al. Chapter 14—Carbon Materials for Spilled-oil Recovery, "Advanced Materials Science and Engineering of Carbon," Butterworth-Heinemann, 2014, pp. 313-334, available online at: http://sciencedirect.com/science/article/pii/B9780124077898000144.

Liu et al. "Wood-graphene oxide composite for highly efficient solar steam generation and desalination," *ACS Applied Materials & Interfaces*, Feb. 2017, 9: pp. 7675-7681.

Palaeos Plants: Glossary R-Se, Palaeos, URL: http://palaeos.com/plants/glossary/glossaryR.html.

"PITS: Ultra-structure, classification & functions: Simple & Bordered Pits (Similarities and Differences)," easybiologyclass.com. Available online at: https://www.easybiologyclass.com/pits-ultra-structure-classification-functions-simple-bordered-pits-similiarities-differences/.

Soil Fertility Project—NAMIBIA, "'Hydrophilic or Hydrophobic?'—That is the Question!," Feb. 11, 2016, available online at: http://www.soilfertilityproject.com/project.com/progress/2016/2/11/hydrophilic-or-hydrophobic-that-is-the-question.

Xue et al., "Robust and Low-Cost Flame-Treated Wood for High-Performance Solar Steam Generation," *ACS Applied Materials and Interfaces*, Apr. 2017, 9(17), pp. 15052-15057.

Yang et al. "Functionalized graphene enables highly efficient solar thermal steam generation," *ACS Nano*, 2017, 11(6): pp. 5510-5518.

* cited by examiner

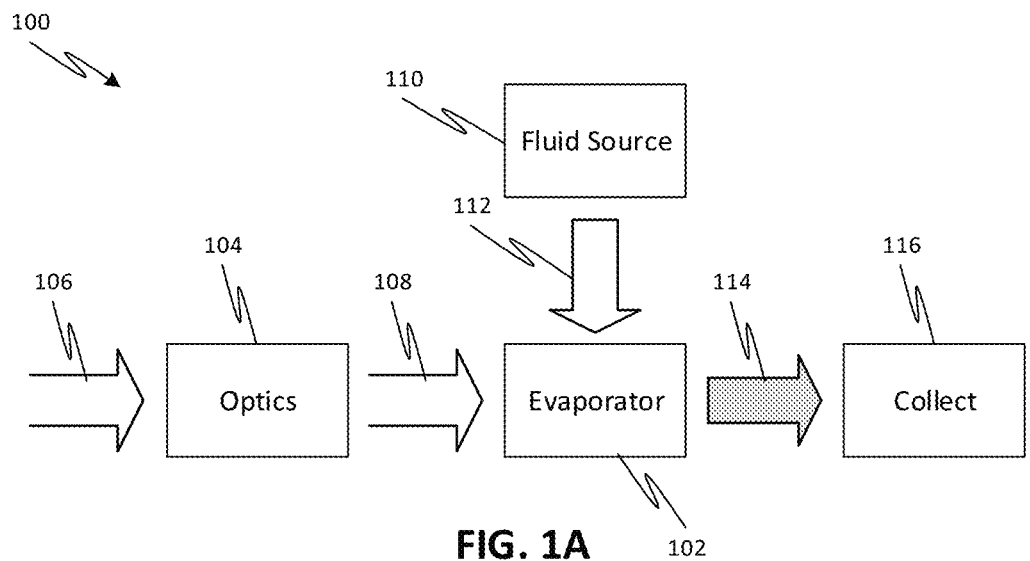
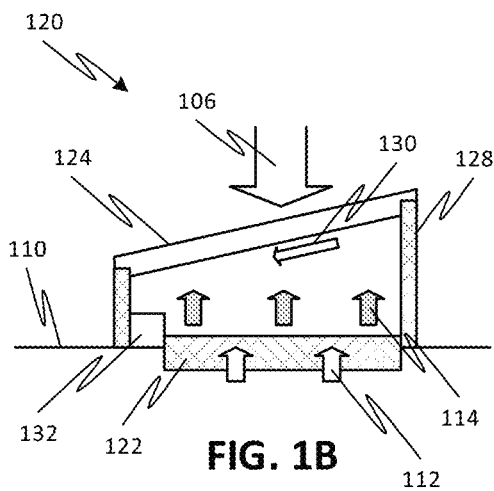
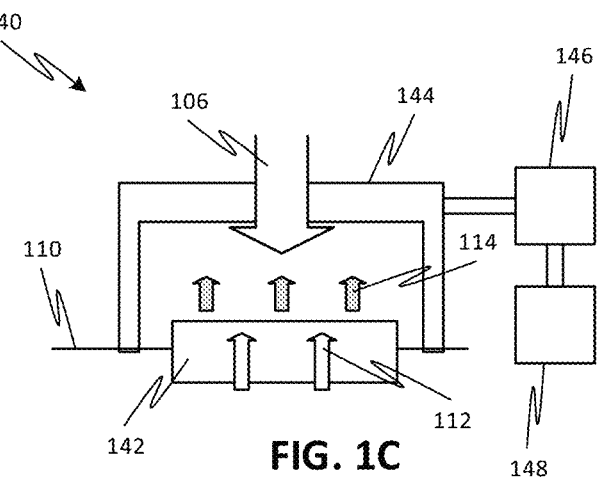
FIG. 1A
FIG. 1B
FIG. 1C
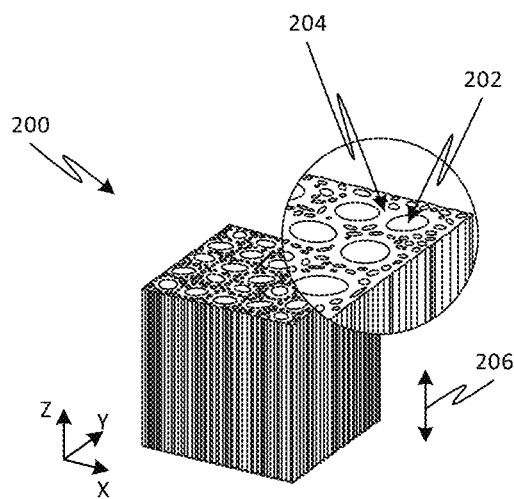
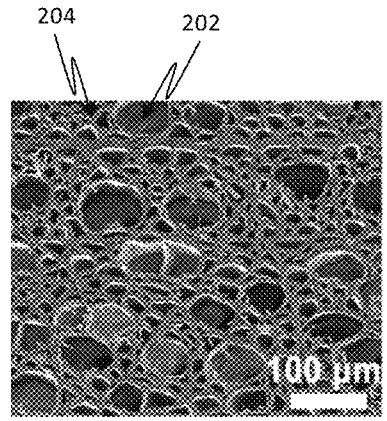
FIG. 2A
FIG. 2B

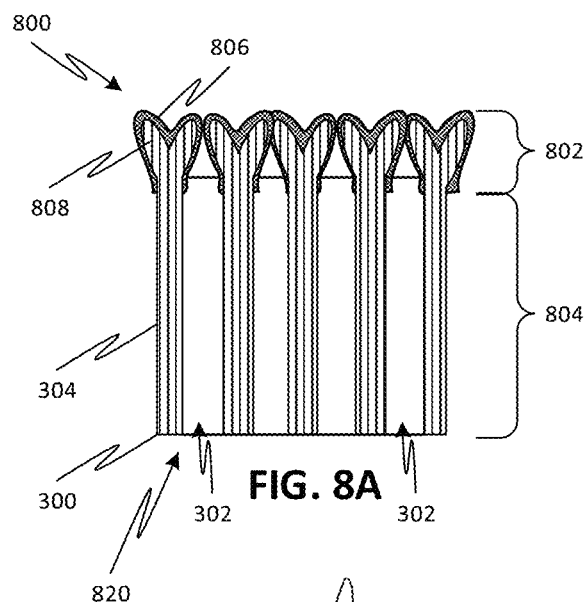
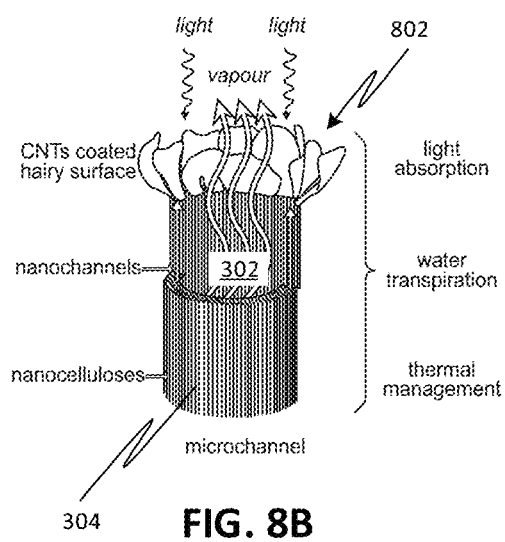
FIG. 8A
FIG. 8B
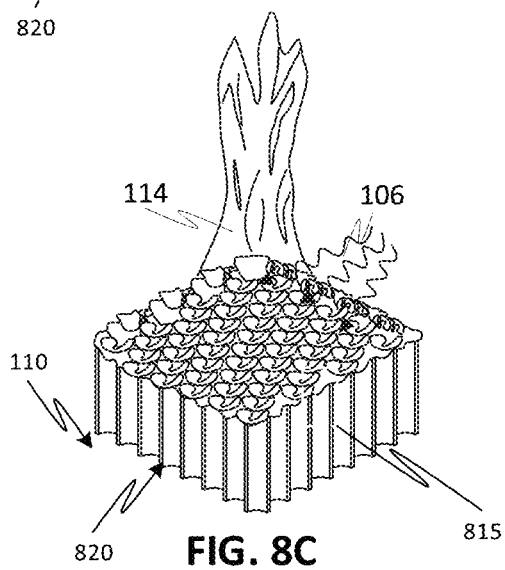
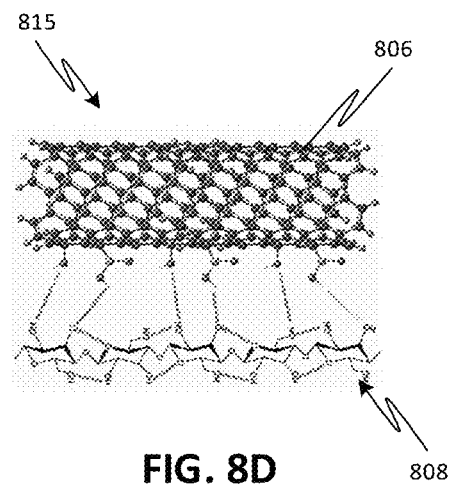
FIG. 8C
FIG. 8D
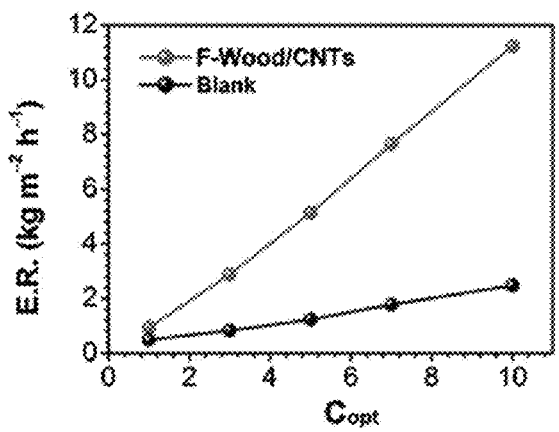
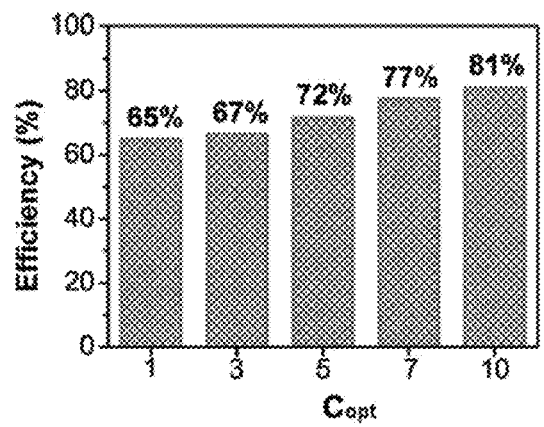
FIG. 9A
FIG. 9B

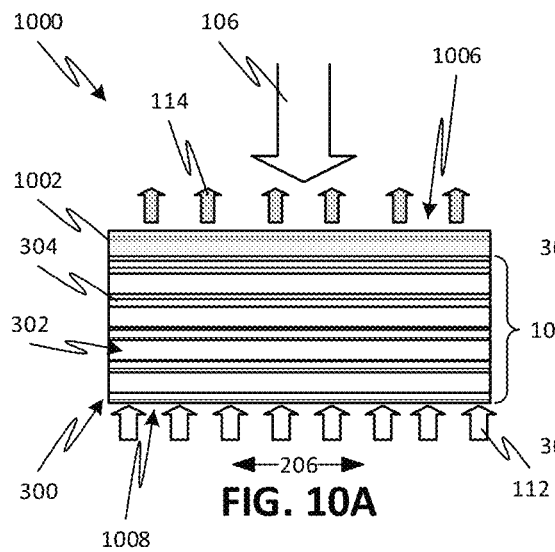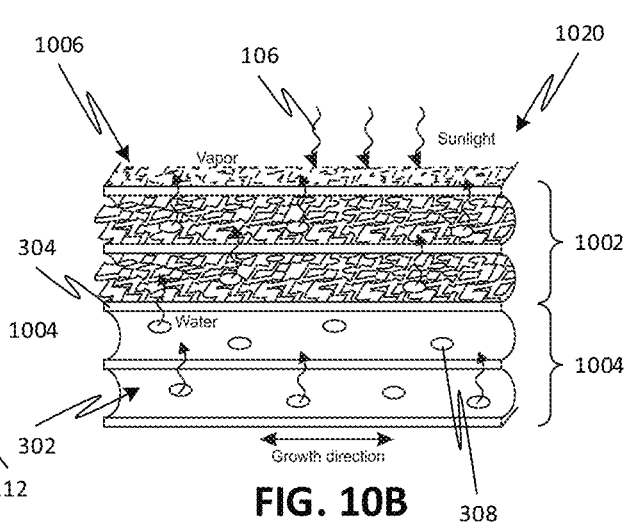
FIG. 10A　　　　　　　　　FIG. 10B
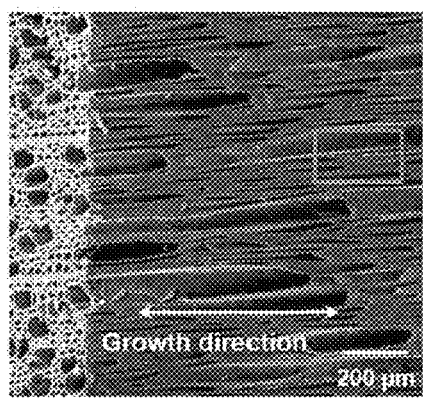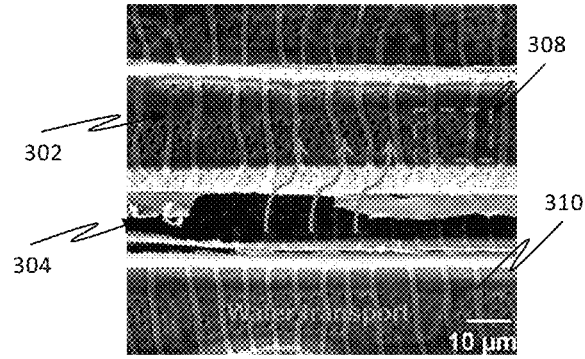
FIG. 10C　　　　　　　　　FIG. 10D
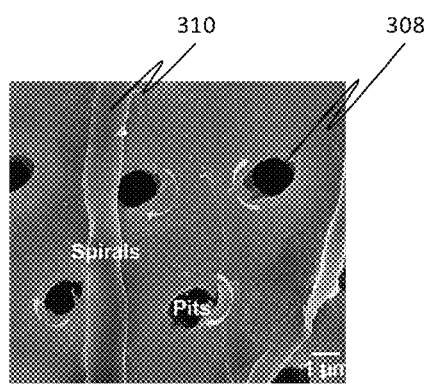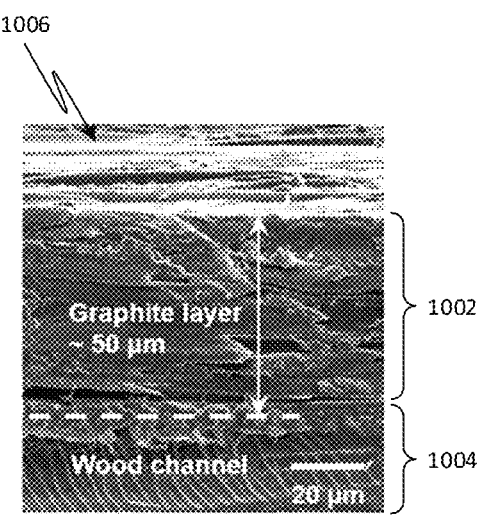
FIG. 10E　　　　　　　　　FIG. 10F

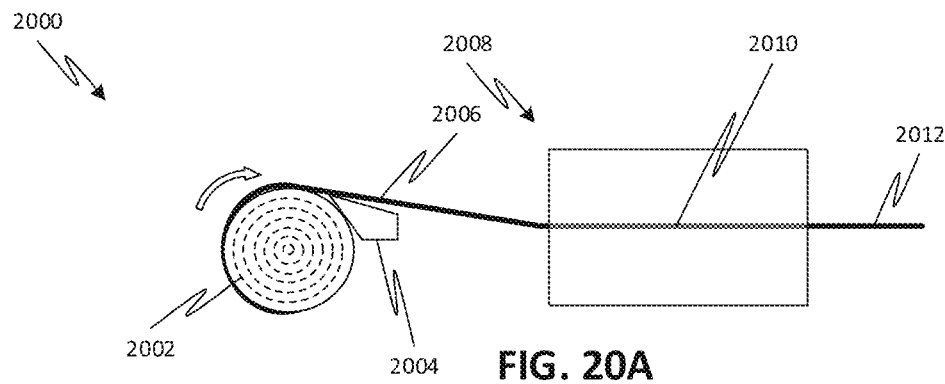
FIG. 20A
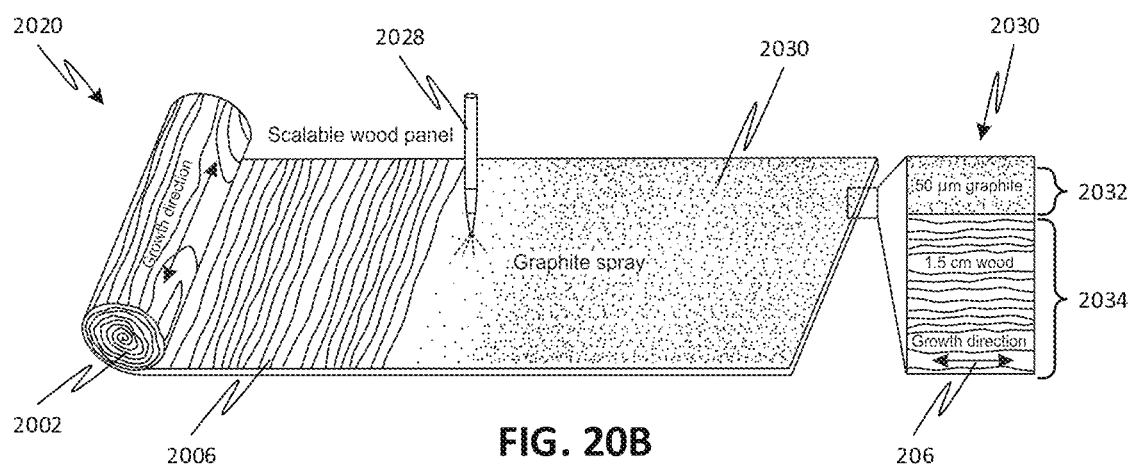
FIG. 20B
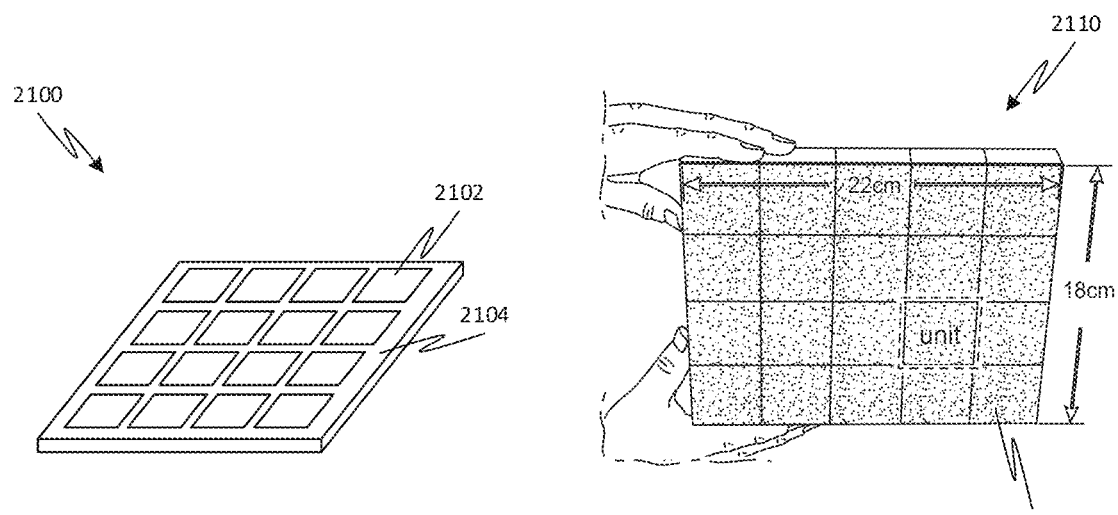
FIG. 21A
FIG. 21B

WOOD-BASED SOLAR THERMAL DEVICES, AND METHODS FOR FABRICATION AND USE THEREOF

CROSS-REFERENCE TO RELATED APPLICATIONS

This application is a divisional of U.S. patent application Ser. No. 16/002,796, filed Jun. 7, 2018, which claims the benefit of U.S. Application No. 62/517,595, filed Jun. 9, 2017. The prior applications are incorporated herein by reference in their entirety.

FIELD

The present disclosure relates generally to solar thermal devices, and, more particularly, to solar thermal devices including a wood-based substrate for fluid or material transport and/or evaporation.

SUMMARY

In embodiments, a solar thermal device is formed from a wood block. The naturally-occurring microstructure (e.g., cell lumen such as vessels, fibers, and tracheids) of the wood block forms an interconnected transport network that is used to passively transport a fluid or material therein. The wood block can be modified to increase absorption of radiation (e.g., insolation), for example, by coating one or more surfaces of the wood block or by modifying a surface layer (e.g., carbonization) of the wood block. The absorbed radiation can heat the wood block (or a portion thereof), which can alter a property of the fluid or material. For example, the heated wood block can cause a phase change of the fluid or material, or can alter a transport property of the fluid or material.

In one or more embodiments, a solar thermal device comprises a natural wood block and a solar absorption layer. The natural wood block can have a first surface, a second surface, an internal fluidic transport network, and a plurality of artificial holes. The first surface can be for receiving solar radiation thereon, while the second surface can be opposite the first surface and can be for contacting fluid. The solar absorption layer can be at or on at least the first surface of the natural wood block. The internal fluidic transport network can be comprised of microstructures of natural wood between the first and second surfaces. The natural wood block can pump fluid from the second surface to the first surface by the internal fluidic transport network via capillary action and/or nano-cavitation effects. Fluid from the internal fluidic transport network and/or from the first surface returns to the second surface via the artificial holes.

In one or more embodiments, a solar thermal device comprises a natural wood block and a solar absorption layer. The natural wood block can have a first surface, a second surface, and an internal fluidic transport network. The first surface can be for receiving solar radiation thereon, while the second surface can be opposite the first surface and can be for contacting fluid. The solar absorption layer can be at or on at least the first surface of the natural wood block. The internal fluidic transport network can be comprised of microstructures of natural wood between the first and second surfaces. The natural wood block can pump fluid from the second surface to the first surface by the internal fluidic transport network via capillary action and/or nano-cavitation effects. The natural wood block has cellulose-based lumen extending along a tree growth direction that is substantially parallel to at least one of the first and second surfaces. The internal fluidic transport network includes spirals or pits between adjacent lumen.

In one or more embodiments, a solar thermal device comprises a carbonized block of natural wood having a first surface, a second surface, and an internal fluidic transport network. The first surface can be for receiving solar radiation thereon, while the second surface can be opposite the first surface and can be for contacting a material to be adsorbed. The internal fluidic transport network can be comprised of microstructures of the natural wood between the first and second surfaces. All internal and external surfaces of the carbonized block have been carbonized such that a porosity of the carbonized block is greater than that of the natural wood. The carbonized wood is constructed to adsorb said material into the internal fluidic transport network.

In one or more embodiments, a method includes cutting a block of natural wood to have a first surface, a second surface opposite the first surface, and an internal fluidic transport network comprised of microstructures of natural wood between the first and second surfaces. The method can further include forming a solar absorption layer on or from at least the first surface of the natural wood block, and forming a plurality of artificial holes extending from the first surface to the second surface.

In one or more embodiments, a method includes providing a wood block having a first surface, a second surface opposite the first surface, a solar absorption layer formed at the first surface, and a fluidic transport network formed by microstructures of natural wood between the first and second surfaces. The fluidic transport network can further include at least one of a plurality of natural lumens extending from the first surface to the second surface and a plurality of artificial holes extending from the first surface to the second surface. Each natural lumen can have a diameter greater than or equal to 100 μm, and each artificial hole having a diameter of 100 μm to 5 mm. The method can further include placing the second surface of the natural wood block in contact with a fluid, and then exposing the first surface to insolation. The wood block can pump fluid from the second surface to the first surface via capillary action and/or nano-cavitation effects in the fluidic transport network, and fluid from the fluidic transport network and/or from the first surface can return to the second surface via the plurality of natural lumens and/or artificial holes.

In one or more embodiments, a method includes providing a carbonized block of natural wood having a first surface, a second surface opposite the first surface, and an internal fluidic transport network comprised of microstructures of the natural wood between the first and second surfaces. The carbonized block can have a porosity greater than that of the natural wood. The method can further include placing the second surface of the carbonized block in contact with a material to be adsorbed, and exposing the first surface to insolation. During the exposing to insolation, the carbonized block heats the material contacting the second surface such that the material has a mobility greater than that of the material prior to exposure to insolation. The carbonized block can adsorb the heated material into the internal fluidic transport network.

Objects and advantages of embodiments of the disclosed subject matter will become apparent from the following description when considered in conjunction with the accompanying drawings.

BRIEF DESCRIPTION OF THE DRAWINGS

Embodiments will hereinafter be described with reference to the accompanying drawings, which have not necessarily been drawn to scale. Where applicable, some features may not be illustrated to assist in the illustration and description of underlying features. Throughout the figures, like reference numerals denote like elements.

FIG. 1A is a simplified schematic illustrating aspects of a solar thermal setup employing a wood-based evaporator, according to one or more embodiments of the disclosed subject matter.

FIG. 1B is a simplified schematic of an exemplary solar thermal device with wood-based evaporator, according to one or more embodiments of the disclosed subject matter.

FIG. 1C is a simplified schematic of another exemplary solar thermal device with wood-based evaporator, according to one or more embodiments of the disclosed subject matter.

FIG. 2A is a simplified illustration of a natural piece of wood.

FIG. 2B is a scanning electron microscope (SEM) image of a cross-section, in a direction perpendicular to tree growth, of natural wood.

FIG. 8A is a simplified schematic diagram of a cross-section of a wood-based evaporator, in a horizontal cut configuration, employing a micro-sheet top surface, according to one or more embodiments of the disclosed subject matter.

FIG. 8B is a simplified cutaway view of an individual cell of a wood-based evaporator according to the structure of FIG. 8A, employing a carbon nanotube (CNT) coating as the solar absorption layer, according to one or more embodiments of the disclosed subject matter.

FIG. 8C is a simplified isometric view illustrating additional aspects of a wood-based evaporator according to the structure of FIG. 8B.

FIG. 8D is a simplified magnified view illustrating the structure of carbon-nanotube coating on microsheet surfaces of the wood-based evaporator of FIG. 8C.

FIGS. 9A-9B are graphs of water extraction performance and steam generation efficiency for a fabricated wood-based evaporator having the structure of FIGS. 8B-8C.

FIG. 10A is a simplified schematic of a cross-section of a wood-based evaporator, in a vertical cut configuration with a solar absorption layer, according to one or more embodiments of the disclosed subject matter.

FIG. 10B is a simplified cutaway view of a wood-based evaporator according to the structure of FIG. 10A, employing graphite as the solar absorption layer, according to one or more embodiments of the disclosed subject matter.

FIG. 10C is an SEM image of a cross-section of a wood-based evaporator fabricated according to structure of FIG. 10B, according to one or more embodiments of the disclosed subject matter.

FIG. 10D is an SEM image of cross-section of vessel lumens of FIG. 10C, illustrating the pits and spirals that facilitate cross-plane transport of fluid.

FIG. 10E is a magnified SEM image of the pits and spirals of FIG. 10D.

FIG. 10F is another SEM image of a wood-based evaporator fabricated according to structure of FIG. 10B, according to one or more embodiments of the disclosed subject matter.

FIG. 18 is a process flow diagram for use of a wood-based evaporator for fluid extraction, distillation, or desalination, according to one or more embodiments of the disclosed subject matter.

FIG. 19 is a process flow diagram for forming a wood-based evaporator or solar thermal device including the wood-based evaporator, according to one or more embodiments of the disclosed subject matter.

FIG. 20A is a simplified schematic illustrating fabrication of vertical cut wood-based evaporators by rotary cutting, according to one or more embodiments of the disclosed subject matter.

FIG. 20B is an illustration of an exemplary manufacturing process according to the generalized process of FIG. 20A.

FIG. 21A is a simplified schematic of a scalable assembly of unit cells of wood-based evaporators, according to one or more embodiments of the disclosed subject matter.

FIG. 21B is an image of a panel assembled from wood-based evaporator unit cells according to the generalized configuration of FIG. 21A.

DETAILED DESCRIPTION

Figure 3A:
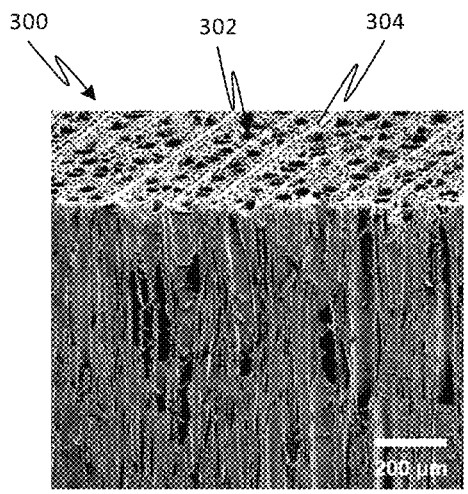
FIG. 3A is an SEM image of natural wood showing top and side surfaces.

Embodiments of the disclosed subject matter provide solar thermal devices formed from a block of natural wood. The natural microchannels (i.e., cell lumen) within the wood are used to transport fluid and/or a material within the block and/or between exterior surfaces of the block. In various embodiments, the block of natural wood can be modified to improve absorption of solar radiation (i.e., insolation). For example, the block of natural wood can include a solar absorptive coating on one or more of the external surfaces, and/or can have a layer thereof that is modified (e.g., by carbonization). Heating due to the absorbed solar radiation can induce changes in the fluid/material, for example, to cause a phase change (e.g., evaporation) or to improve a transport property thereof (e.g., to allow the material to flow into the block).

FIG. 1A illustrates generalized aspects of a solar thermal setup 100, where a block of modified natural wood is used as an evaporator 102. Wood-based evaporator 102 can be placed into contact with a fluid source 110, which may be a body of the fluid (e.g., ocean or lake) or a material containing the fluid (e.g., soil or sand). The modified natural wood block can interact with fluid source 110 to draw a portion of fluid 112 into the wood block, for example, by capillary effect in the naturally-hydrophilic microchannels of the wood block.

Wood-based evaporator 102 can receive insolation 108 that heats the fluid 112 in the evaporator 102 to generate vapor 114. For example, optical system 104 can be provided to direct incident insolation 106 to evaporator 102. In some embodiments, insolation 106 can be focused by optical system 104, such that the incident radiation 108 on the evaporator 102 has an intensity greater than 1 sun. For example, the optical system 104 can include a transmission-based concentrator (e.g., one or more lenses) and/or a reflection-based concentrator (e.g., one or more mirrors). The vapor 114 that emanates from the evaporator 102 can be collected by collector 116 for further use. For example, the setup 100 can be used to provide desalination or distillation of a fluid (e.g., water). In such configurations, the collector 116 can collect and condense the vapor 114 in order to provide the desalinated or distilled fluid.

FIG. 1B illustrates an example of a solar thermal system 120 based on the principles of FIG. 1A. Solar thermal system 120 includes a wood-based evaporator 122 disposed with a surface thereof in contact with fluid source 110. An insulating housing 128 is coupled to the wood-based evaporator 122 and supports optically-transmissive plate 124 above the evaporator 122. For example, the optically-transmissive plate 124 can be a transparent glass or plastic plate (i.e., no focusing) or a lens (e.g., Fresnel lens) formed of glass or plastic (i.e., focusing). In this configuration, the optically-transmissive plate 124 serves as both input optical system 104 and a portion of collector 116. Thus, fluid 112 is transported through the evaporator 122 where it is heated proximal to an upper surface of the evaporator 112 by incident solar radiation 106 to generate vapor 114. The vapor 114 collects on plate 124, where it condenses to form fluid drops 130. The fluid drops 130 are directed by the effect of gravity along the sloped surface of plate 124 to be collected by basin 132.

FIG. 1C illustrates another example of a solar thermal system 140 based on the principles of FIG. 1A. Solar thermal system 140 includes a wood-based evaporator 142 disposed with a surface thereof in contact with fluid source 110. A capture hood 144 can be disposed over the evaporator 142 to capture the generated vapor 114. The capture hood 144 may be constructed to allow solar radiation 106 to pass therethrough to evaporator 142. Optionally, the capture hood 144 can include focusing optics to increase an intensity of the radiation incident on an absorbing surface of the evaporator 142. The captured vapor can be directed to a condenser 146 to convert the vapor back to a fluid, which can then be stored in a container 148 for later or immediate use.

As noted above, transport of the fluid in the wood-based evaporator 102 can be via the natural microchannels formed by cells of the wood. Natural wood has a unique three-dimensional porous structure 200 with multiple channels, including lumina 202 extending in a direction 206 of wood growth, as illustrated in FIGS. 2A-2B. Cell walls 204 in the natural wood 200 are mainly composed of cellulose, hemicellulose, and lignin, with the three components intertwining with each other to form a strong and rigid wall structure.

Wood can be divided into hardwood and softwood based on its physical structure and composition. For example, hardwoods can include balsa, bass, cocobolo, elm, locust, maple, oak, olive, padauk, and poplar wood. For example, softwoods include cedar, pine, and yew. Hardwood is formed of three kinds of cells—fiber tracheids, vessel elements, and parenchyma. Vessels in hardwood have a large lumen diameter and are connected by perforation plates at the cell ends to function as the main pathways for water transport. The fiber tracheids with a smaller lumen diameter are interconnected through pits and mainly used for structural support.

Figure 3B:
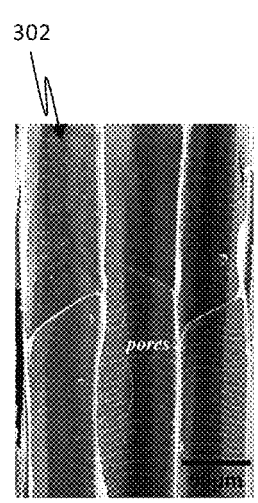
FIG. 3B is an SEM image of a longitudinal cross-section of the natural wood of FIG. 3A, illustrating vessel lumen for fluid transport and small pits that facilitate transport to neighboring lumen.
Figure 3C:
FIG. 3C is an SEM image showing a detailed view of the cell wall of a lumen of FIG. 3B, where aligned cellulose microfibrils are embedded within lignocellulosic matrices.

For example, FIGS. 3A-3B show vessels 302 and interstitial tracheids 304, formed by respective cell walls, in block of wood 300, where the cell walls are formed of aligned cellulose microfibrils embedded within a lignocellulosic matrix as shown in FIG. 3C. As such, the hardwoods have two peaks in pore size distribution corresponding to the fiber tracheid and vessel diameters. In contrast, softwood is primarily formed of highly elongated tracheids and parenchyma. The tracheids have the function of providing mechanical support and transferring water via bordered pits. As such, the softwoods exhibit a more homogenous pore size distribution.

In spite of their structural differences, both hardwood and softwood have inherent hierarchical structures, with vertically-aligned microchannels for transporting water, ions, and other nutrients. Moreover, the cellulose and hemicellulose contain a large number of hydroxyl groups and are highly hydrophilic. Thus, the composition of the wood yields hydrophilicity of the cell walls and a similar overall structure of the wood block, regardless of the wood species. The hydrophilic and porous structure of evaporators formed by natural wood of either hardwood or softwood can provide efficient transport of fluid by capillary action. Accordingly, embodiments of the disclosed wood-based evaporator may be formed of any type of wood.

In some embodiments, the selection of wood may be based on a particular application as well as the microstructure of the underlying wood. For example, in some applications, the density of the wood may be greater than that of the fluid, which would otherwise cause the evaporator to sink in a body of the fluid. Accordingly, wood for the evaporator may be selected so as to have a lower density than the fluid, so that it naturally floats in the body of fluid. In another example, selection of the wood for the evaporator may be based on the porosity and/or lumen size of the wood, as discussed elsewhere herein.

Figure 4A:
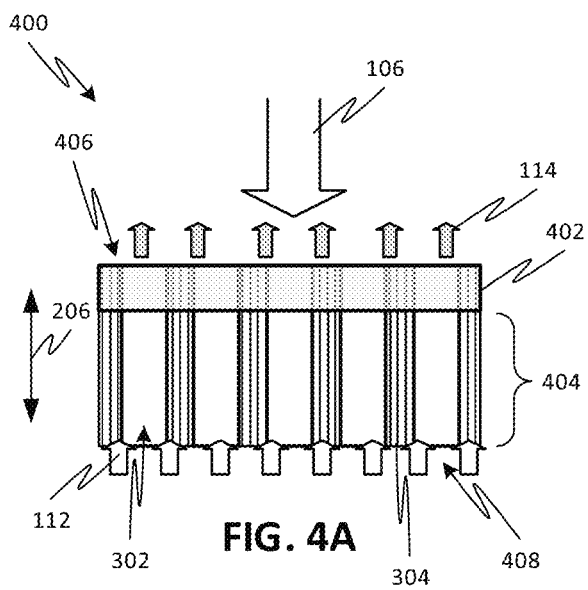
FIG. 4A is a simplified schematic of a wood-based evaporator in a horizontal cut configuration with a solar absorption layer, according to one or more embodiments of the disclosed subject matter.

As shown in FIG. 4A, a wood-based evaporator 400 can be formed of a block of natural wood that has been subject to a horizontal cut, i.e., where wood is cut in a direction perpendicular to the tree growth direction 206, such that lumen 302 extend along a direction substantially perpendicular to top surface 406 and/or bottom surface 408. Accordingly, fluid 112 is transported by the lumen 302 (as well as any smaller diameter lumen (e.g., fiber tracheids) formed in interstitial region 304) from the bottom surface 408, which is in contact with a fluid source, to top surface 406, which receives and absorbs insolation 106. The fluid 112 is transported based on the capillary effect of the hydrophilic microstructures as well as any nano-cavitation effects resulting from evaporation 114 of fluid at top surface 406.

The top surface 406 of the evaporator 400 is coated to form a solar absorption region 402, or is modified to have a solar absorption region 402. For example, the solar absorption region 402 can be a carbonized portion of the natural wood. Alternatively or additionally, solar absorption region 402 can comprise a coating of at least one of nanoparticles, nanowires, graphene, graphene oxide, reduced graphene oxide, graphite, single walled carbon nanotubes, double walled carbon nanotubes, multiwalled carbon nanotubes, polyaniline, carbon black, amorphous carbon, hard carbon, and soft carbon.

Thus, the evaporator 400 includes a region 404 that is substantially natural wood (i.e., preserves the natural microstructure of the wood) while a region 402 thereof has been modified to increase the solar absorption of the wood. Heating of region 402 due to absorption of solar radiation causes evaporation of fluid at the top surface 406. The natural wood region 404 has a relatively low thermal conductivity, and thus isolates the heating to region 402, thereby improving the vapor generation efficiency of the evaporator 400.

Figure 4B:
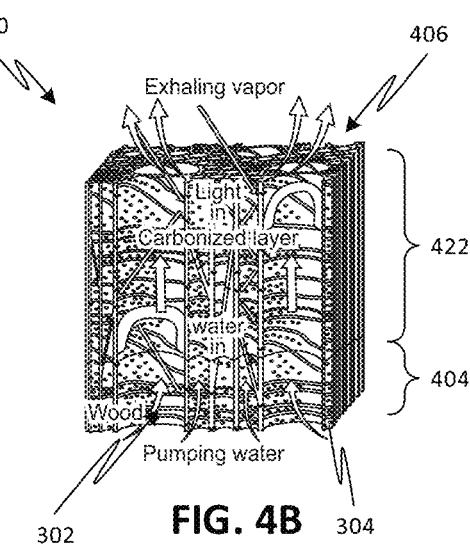
FIG. 4B is a simplified schematic illustrating an evaporator according to the structure of FIG. 4A, with a carbonized layer as the solar absorption layer, according to one or more embodiments of the disclosed subject matter.
Figure 5A:
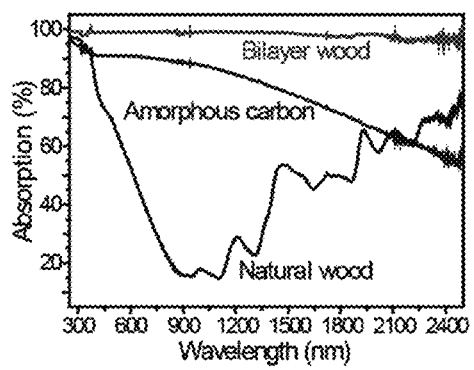
FIG. 5A is a graph of experimentally measured light absorption spectra for the fabricated wood-based evaporator of FIG. 4C (bi-layer wood) as compared to amorphous carbon and natural wood.

FIG. 4B shows an exemplary wood-based evaporator 420 according to the principles of FIG. 4A for water extraction, distillation, or desalination applications. The wood-based evaporator 420 has a carbonized layer 422 at top surface 406 and a natural wood region 404. The top carbonized portion 422 acts as an efficient 3D light absorber layer. Moreover, the channels 302 within portion 422 can guide the incident light via numerous reflection in the wood mesostructures (e.g., vessels 302), thereby improving light absorption. Thus, evaporator 420 can absorb sunlight more effectively than a natural wood layer, as suggested by FIG. 5A. Additionally, the low thermal conductivity of the natural wood layer 404 (e.g., approximately 0.2 $Wm^{-1}K^{-1}$) drastically reduces the heat dissipation from the top carbonized surface 422, thereby concentrating the heating at the top surface 406 for more efficient steam generation.

Figure 4C:
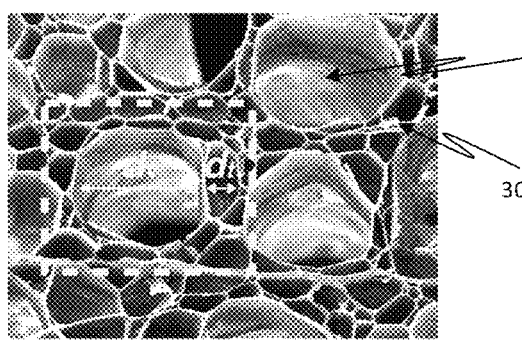
FIG. 4C is an SEM image of the top carbonized surface of a wood-based evaporator having the structure of FIG. 4B, according to one or more embodiments of the disclosed subject matter.
Figure 4D:
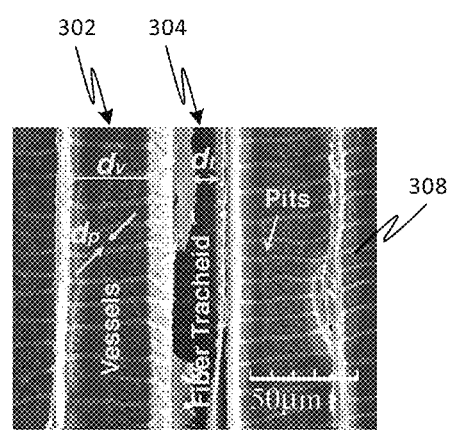
FIG. 4D is an SEM image of a cross-section of the wood-based evaporator of FIG. 4C showing the microstructure comprised of vessels, fiber tracheids, and pits.

Meanwhile, the natural wood layer 422 provides rapid and efficient water transport. In particular, the wood-based evaporator 420 has interconnected channels (fiber tracheids 304 with an average size $dt \approx 5$-15 µm, and vessels 302 with an average size dv 50 µm, as shown in FIGS. 4B-4D) within the top light-absorbing layer 402 as well as the bottom water-pumping layer 404. Due to the hydrophilic polysaccharides (i.e., cellulose microfibrils and hemicellulose) embedded within the lignocellulosic walls, the pristine wood portion 404 is hydrophilic, which promotes rapid water transport between the bottom surface 408 and the top surface 406. The presence of vessels and/or fiber tracheids also induces a capillary effect that draws water into evaporator 420.

Although the lignin of the cell walls reduces the permeability of water between adjacent cells, lateral water transport between adjacent vessels and/or tracheids 304 is possible via pits 308 (with an average size $dp \approx 2$ µm), as illustrated in FIG. 4D. This lateral transport can reduce the risk of cavitation-induced embolism. Thus, the wood-based evaporator 420 has an internal fluidic transport network comprised of the vessels, fiber tracheids, and/or pits that allow for three-dimensional transport of water from a surface 408 in contact with water (whether a body of water or water embedded within soil or sand) to a solar absorption surface 406 for evaporation.

After carbonization, the top surface 406 of the wood may become more porous, as illustrated in FIG. 4C, which is beneficial to water transport and light absorption during solar steam generation. The open microchannels 302 within the carbonized top layer 422 allow water vapor/steam to escape without interference from any crystallized salt that may build up during the evaporation process. In some embodiments, the through-channels 302 can dramatically reduce salt accumulation during device operation due to highly efficient mass exchange with the salt water source. There is also a microstructural match at the interface between the carbonized wood section 422 and natural wood section 404, which further facilitates efficient water transport.

Figure 5B:
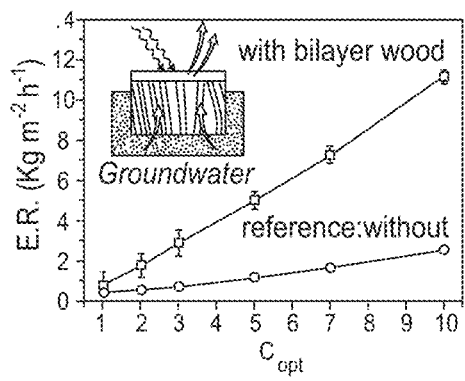
FIG. 5B is a graph of groundwater extraction performance of the fabricated wood-based evaporator of FIG. 4C when placed in wet sand.
Figure 5C:
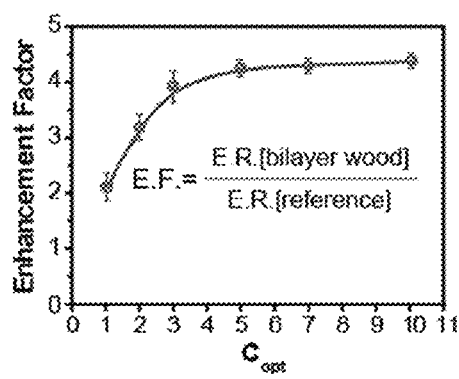
FIG. 5C is a graph of enhancement factor for groundwater extraction by the fabricated wood-based evaporator of FIG. 4C when placed in wet sand.
Figure 5D:
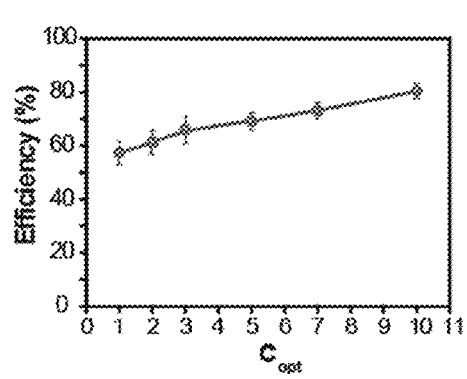
FIG. 5D is a graph of solar steam generation efficiency at different light intensities for groundwater extraction by the fabricated wood-based evaporator of FIG. 4C when placed in wet sand.
Figure 5E:
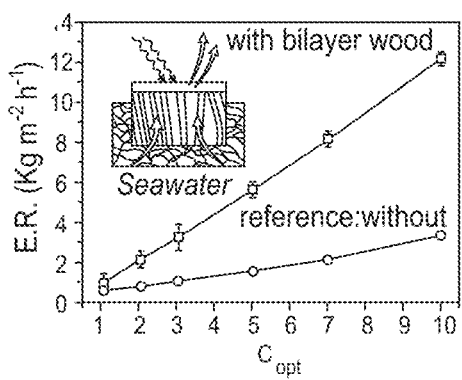
FIG. 5E is a graph of desalinated water extraction performance of the fabricated wood-based evaporator of FIG. 4C when placed in seawater.
Figure 5F:
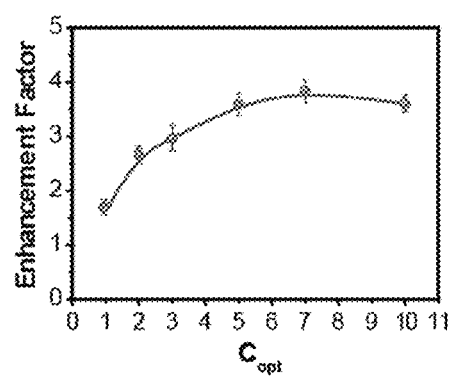
FIG. 5F is a graph of enhancement factor for desalinated water extraction by the fabricated wood-based evaporator of FIG. 4C when placed in seawater.
Figure 5G:
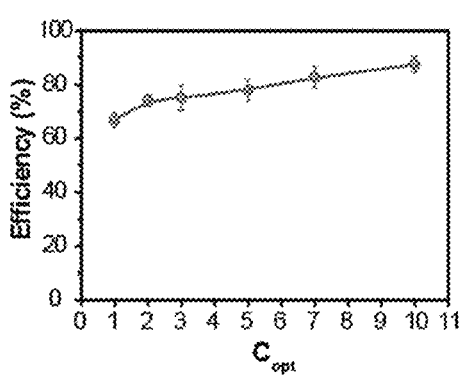
FIG. 5G is a graph of solar steam generation efficiency at different light intensities for desalinated water extraction by the fabricated wood-based evaporator of FIG. 4C when placed in seawater.

A solar thermal device fabricated according to FIG. 4B was tested to assess its performance with respect to various metrics relevant to water extraction and desalination. In summary, the fabricated device of FIG. 4B demonstrated (1) $\approx$99% light absorption (see FIG. 5A); (2) $\geq$80% efficiency under 10 sun illumination, where 1 Copt=1 $kW/m^2$ (see FIGS. 5D and 5G); (3) linear operation up to 10 suns (see FIGS. 5B and 5E); (4) stable operation without corrosion or solar degradation (under 5 sun illumination for 100 h); (5) long-term stability in seawater without salt accumulation, and (6) successful water extraction directly from the ground (sand or soil). FIGS. 5C and 5F illustrate the measured enhancement factor for the fabricated solar thermal device of FIG. 4B in groundwater extraction and desalination applications, respectively, where the enhancement factor (E.F.) is the ratio of evaporation rate (E.R.) with the evaporator of FIG. 4B to the E.R. without the evaporator.

As noted above, the solar thermal device fabricated according to FIG. 4B can exhibit continuous and stable operation over extended use in desalination applications. In particular, the device was tested with concentrated illumination of 5 suns for over 100 h without issue. Salt deposition was generally only apparent when illumination intensities were greater than or equal to suns, which indicates that at higher illumination intensities the surface evaporated water cannot be readily replenished by the water that refills the channels. In this case, the amount of salt that deposits on the wood surface increases to a level that can be observed. However, salt accumulation may not be an issue for ambient solar irradiation (1 sun) since the relatively slow evaporation rates at lower illumination intensities hinder the ability of salt to reach its crystallization concentration.

Nevertheless, the salt that accumulates during operation under 5 suns does not noticeably reduce the steam generation performance. Furthermore, the solar thermal device fabricated according to FIG. 4B can exhibit a unique self-regenerating ability. At night, or other periods of reduced or no insolation, the natural wood region 404 continues to pump water via its fluidic transport network even though evaporation via top surface 406 is reduced or stops. The continuous water transport allows the precipitated salt within the wood structure to dissolve (for water soluble salts, such as NaCl and KCl) and/or to fall (for sparingly soluble salts, such as calcium carbonate, calcium sulfate, and magnesium hydroxide) back to the surrounding seawater.

Figure 5H:
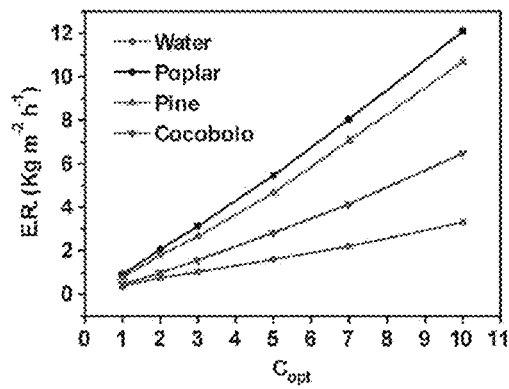
FIG. 5H is a graph comparing the solar steam generation efficiency for pure water extraction by wood-based evaporators of FIG. 4C fabricated using different types of wood.

The differences in microstructure of different wood species result in differences with respect to densities, porosities, thermal conductivities, and mechanical properties, thereby providing tunable functionalities that can be utilized in various applications. For example, various solar thermal devices according to FIG. 4B were fabricated using different wood materials. FIG. 5H shows the measured evaporation rates for those solar thermal devices under different illumination conditions. Wood having a higher porosity (e.g., poplar) generally resulted in higher efficiency as compared to lower porosity wood (e.g., cocobolo), due to higher water absorption and lower thermal conductivity. Moreover, the lower density of higher porosity wood generally resulted in a greater increase in temperature as compared to higher density wood, which may be attributed to the higher incident light absorption of the carbonized layer and the light capturing capability of the wood microchannels.

Figure 6A:
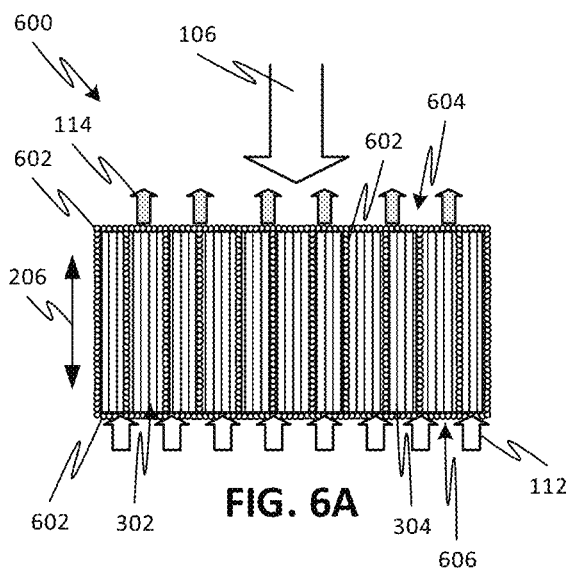
FIG. 6A is a simplified schematic of a wood-based evaporator in a horizontal cut configuration with particles coated on multiple surfaces of the wood as the solar absorption layer, according to one or more embodiments of the disclosed subject matter.

As shown in FIG. 6A, a wood-based evaporator 600 can be formed of a block of natural wood that has been subject to a horizontal cut similar to the wood-based evaporator 400 of FIG. 4A. However, in contrast to evaporator 400, which has a solar absorption layer 402 at top surface 406, evaporator 600 has a plurality of particles 602 deposited on the natural wood structure. The particles 602 can be disposed over at least the top surface 604 of the wood block. In some embodiments, the particles 602 can be disposed over cell walls within the wood (e.g., surfaces of vessels 302 and/or tracheids in interstitial region 304), bottom surface 606, and/or external side surfaces of the wood.

For example, the particles can comprise one or more of nanoparticles, nanowires, graphene, graphene oxide, reduced graphene oxide, graphite, single walled carbon nanotubes, double walled carbon nanotubes, multiwalled carbon nanotubes, polyaniline, carbon black, amorphous carbon, hard carbon, and soft carbon. In some embodiments, the particles are plasmonic metallic nanoparticles formed of Au, Pt, Pd, Ru, Fe, Co, Ni, Sn, or Mo. The particles 602 act to improve the solar absorbance of the natural wood.

Figure 6B:
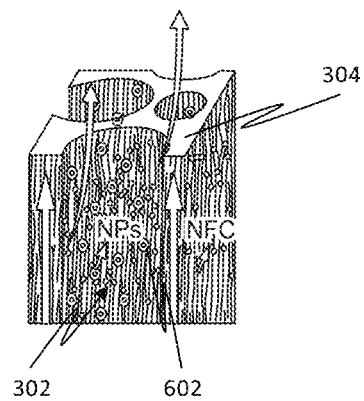
FIG. 6B is a simplified schematic illustrating a magnified portion of an evaporator according to the structure of FIG. 6A, with plasmonic nanoparticles, and illustrating water transport along microchannels of the evaporator, according to one or more embodiments of the disclosed subject matter.
Figure 6C:
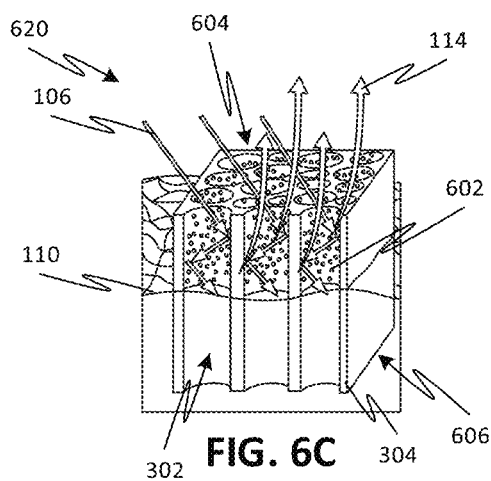
FIG. 6C is a simplified schematic illustrating additional aspects of a wood-based evaporator according to the structure of FIG. 6B.
Figure 6D:
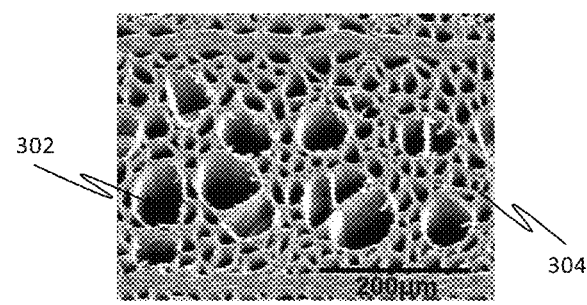
FIG. 6D is an SEM image of a top surface of a wood-based evaporator having the structure of FIG. 6C.
Figure 6E:
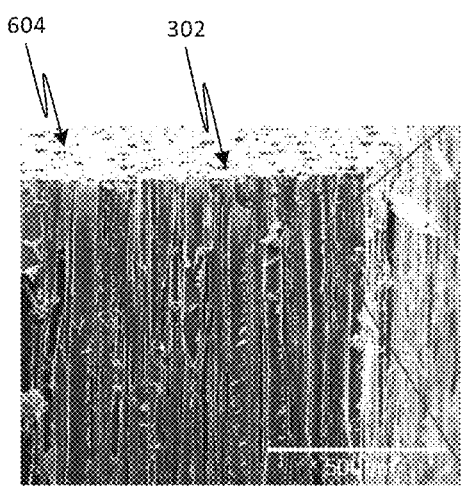
FIG. 6E is an SEM image showing top and side surfaces of the wood-based evaporator of FIG. 6D.
Figure 6F:
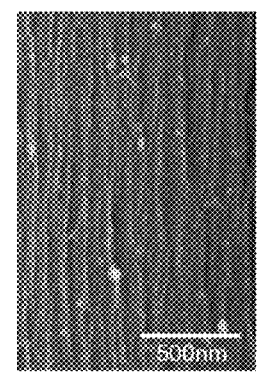
FIG. 6F is an SEM image of a longitudinal cross-section of the wood-based evaporator of FIG. 6D, illustrating aligned cellulose nanofibers.

For example, FIGS. 6B-6C show an exemplary wood-based evaporator 620 fabricated according to the principles of FIG. 6A for water extraction, distillation, or desalination applications. In particular, wood-based evaporator 620 has plasmonic nanoparticles 602 formed over internal and external surfaces of the wood block. Thus, unlike the bilayer structure of evaporator 420 of FIG. 4B, evaporator 620 has a substantially monolayer structure.

Figure 7A:
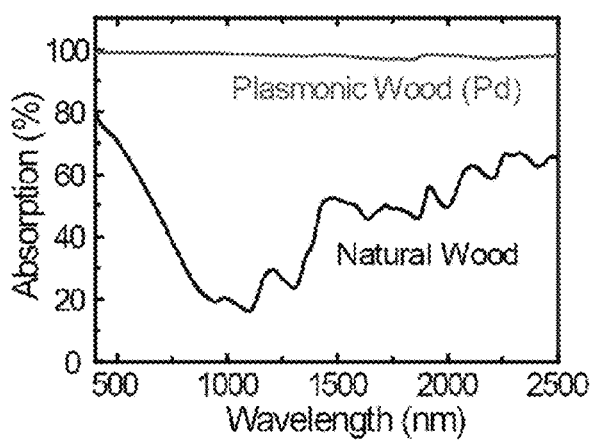
FIG. 7A is a graph of experimentally measured light absorption spectra for the fabricated wood-based evaporator of FIG. 6D (plasmonic wood) as compared to natural wood.
Figure 7B:
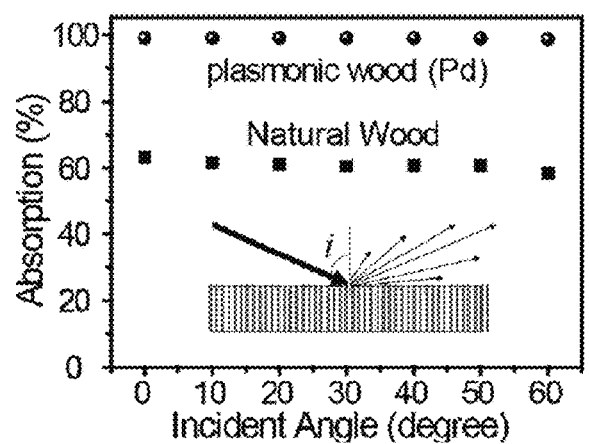
FIG. 7B is a graph of angle resolved absorption of the fabricated wood-based evaporator of FIG. 6D as compared to natural wood at a wavelength of 550 nm.

Portions of channels 302 proximal to top surface 604, which have diameters much larger than the wavelength of the solar radiation, can guide the incident light via numerous reflections and scattering within the wood mesostructures (e.g., vessels 302), thereby improving light absorption. Enhanced solar absorption of the wood is also provided by the plasmonic nanoparticles 602, which convert the incident light into heat based on the plasmonic effect, i.e., the dipole resonance coupling with the incident light. As a result, high light absorption can be achieved within a broadband wavelength range from 400 to 2500 nm, which can harvest most of the solar energy. Thus, evaporator 620 can absorb sunlight more effectively than the natural wood layer, as suggested by FIG. 7A, and with less sensitivity to light incident angle, as suggested by FIG. 7B. Additionally, the low thermal conductivity of the natural wood layer, which is not significantly affected by the plasmonic nanoparticles, helps localize the heating at the top surface 604 for more efficient steam generation.

Figure 6G:
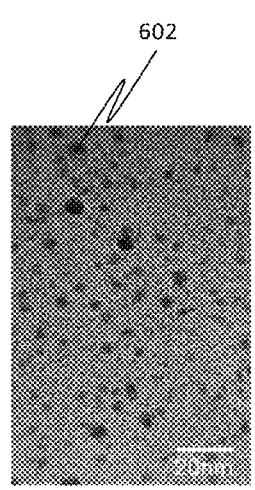
FIG. 6G is a transmission electron microscope (TEM) image of palladium (Pd) nanoparticles on a surface of a microchannel of the wood-based evaporator of FIG. 6D.

Similar to the evaporator 420 of FIG. 4B, the evaporator 620 of FIG. 6C provides rapid and efficient water transport based on the underlying hydrophilic microstructure of vessels and/or fiber tracheids. Moreover, the deposition of the plasmonic nanoparticles is relatively thin compared to the dimensions of the microchannels, as shown by FIGS. 6D-6G. Indeed, as shown in FIG. 6G, deposited Pd nanoparticles are only about 5 nm in diameter, whereas the channel dimensions are on the order of tens of microns. In addition, the fluidic transport network of the wood maintains hydrophilic properties despite the deposition of the nanoparticles. Thus, the nanoparticles do not obstruct the flow of fluid through the fluidic transport network of the wood block, i.e., from the bottom surface 606 to the top surface 604.

In a fabricated embodiment, the wood block of evaporator 620 had a thickness (from the bottom surface 606 to the top surface 604) of approximately 2 cm. When the wood is too thick, the water uptake to the evaporation layer may be insufficient for solar steam generation, which decreases the evaporation rate. When the wood is too thin, the heat generated by absorbed solar radiation cannot be confined to the top of the evaporator. In other words, heat dissipates into bulk water 110 and decreases the energy at the surface 604. Thus, a thickness for the wood block can be selected with these competing interests in mind. For example, in any of the disclosed embodiments, the wood block can have a thickness of 5 cm or less.

Figure 7C:
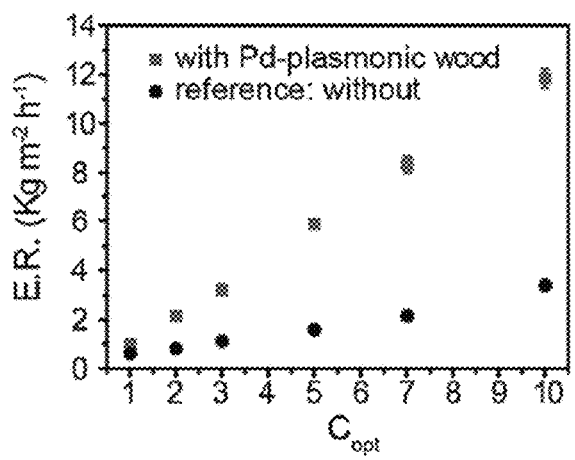
FIGS. 7C-7E are graphs of steam evaporation rate, enhancement factor, and steam generation efficiency, respectively, for the fabricated wood-based evaporator of FIG. 6D as a function of different solar illumination intensities.
Figure 7D:
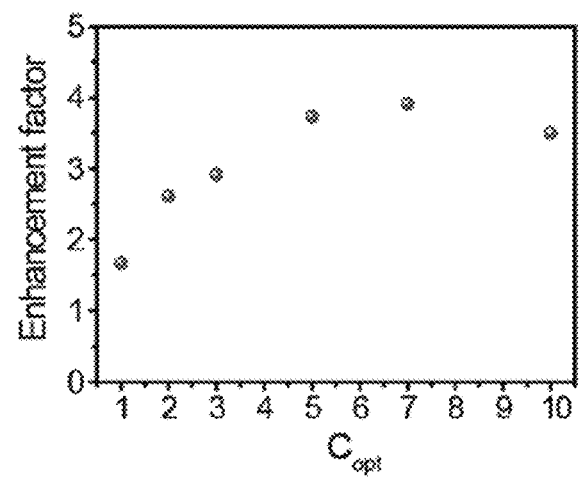
Figure 7E:
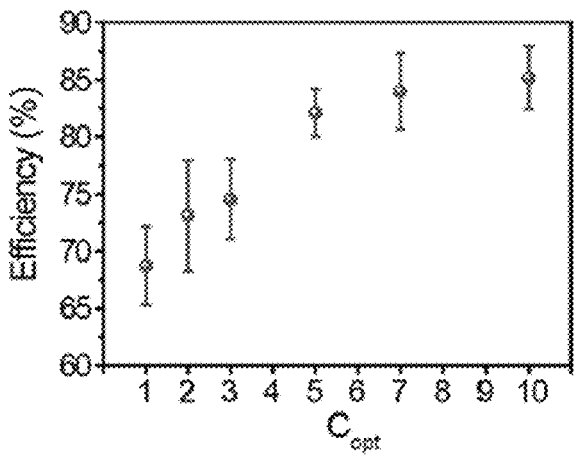

A solar thermal device fabricated according to FIG. 6C was tested to assess its performance with respect to various metrics relevant to water extraction and desalination. In summary, the fabricated device of FIG. 6C demonstrated (1) ≈99% light absorption (see FIG. 7A); (2) ≥85% efficiency under 10 sun illumination (see FIG. 7E); (3) linear operation up to suns (see FIG. 7C); and (4) stable operation without corrosion or solar degradation. FIG. 7D illustrates the measured E.F. for the fabricated solar thermal device of FIG. 6C, where the E.F. is defined as the vapor rate of water with the device of FIG. 6C as compared to bare water.

Similar to the solar thermal devices of FIG. 4B, the solar thermal device of FIG. 6C also exhibits a regeneration capability when operated in a desalination application. In particular, any salt that accumulates during operation under concentrated illumination (e.g., ≥suns) can be passively removed during periods of no or reduced insolation. At night, or other periods of reduced or no insolation, the evaporator 620 continues to pump water via its fluidic transport network even though evaporation via top surface 604 is reduced or stops. The continuous water transport allows the precipitated salt within the wood structure to dissolve (for water soluble salts, such as NaCl and KCl) and/or to fall (for sparingly soluble salts, such as calcium carbonate, calcium sulfate, and magnesium hydroxide) back to the surrounding seawater. Thus, solar thermal devices fabricated according to FIG. 6C have shown excellent cycling performance (e.g., 8 hours of radiation exposure followed by 16 hours of darkness) in solar steam generation, without any degradation in performance over 144 hours of operation.

As shown in FIG. 8A, a wood-based evaporator 800 can be formed of a block of natural wood that has been subject to a horizontal cut similar to the wood-based evaporator 400 of FIG. 4A. However, in contrast to the evaporator 400 which has a substantially flat solar absorption layer 402 at top surface 406, evaporator 800 has a roughened top surface 802. In particular, top surface 802 can include rough "flower-like" protrusion or microsheets 808. For example, the protrusions 808 can be formed by cutting the top surface of natural wood with an electric saw. The microsheets 808 increase the surface area and elongate the optical path for multiple scattering, thereby enhancing the light absorbability.

The roughened top surface 802 can include solar absorption coating 806. For example, the coating 806 can comprise one or more of nanoparticles, nanowires, graphene, graphene oxide, reduced graphene oxide, graphite, single walled carbon nanotubes, double walled carbon nanotubes, multiwalled carbon nanotubes, polyaniline, carbon black, amorphous carbon, hard carbon, and soft carbon.

In some embodiments, the evaporator 800 may be chemically-modified to alter physical characteristics thereof. For example, the natural wood structure can be treated with a chemical solution to partially remove lignin and hemicellulose, thereby resulting in a flexible evaporator. The resulting composition of an exemplary flexible wood evaporator is reflected below in Table 1. The chemically treated wood can be subject to freeze drying (e.g., for 2 days) or critical point drying in order to maintain an unblocked structure for the cell lumen.

TABLE 1

Composition of natural wood and resulting treated wood for use in vapor generation

|  | Cellulose | Hemicellulose | Lignin |
| --- | --- | --- | --- |
| Natural Wood (100) | 40.0% | 15.9% | 24.0% |
| Treated Wood (200) | 37.6% | 11.6% | 19.8% |

For example, FIGS. 8B-8C show an exemplary wood-based evaporator 820 fabricated according to the principles of FIG. 8A for water extraction, distillation, or desalination applications. In particular, the wood-based evaporator has a coating 806 comprised of carbon nanotubes (CNTs) on microsheets 808 of top surface 802, which CNT coating 806 can act to improve the solar absorbance of the natural wood. FIG. 8D is a magnified view of region 815 in FIG. 8C, illustrating the coupling between CNT coating 806 and wood surface 808. In a fabricated example, the mass percentage of coating 806 of the CNTs was 0.3-0.5 wt %. The flower-like surface was uniformly coated with layer 806 of CNTs, while the inside of channels 302 remained smooth without CNT coating. Strong interactions and connections between CNTs and the wood matrix result from the abundant —OH and —COOH groups on the surface of the CNTs and —OH groups on the cellulose, as illustrated in FIG. 8D.

Thermal losses can be minimized by localizing the photothermal generation at the air-water interface within the thermally insulating wood matrix, in particular by restricting the coating 808 to an upper region of the device 820. The wood itself is also a good thermal insulator, such that the majority of the generated heat will be localized at the top surface 802. As illustrated in FIG. 8C, when sunlight 106 illuminates evaporator 820, the rough, coated, flower-like surface 808 will absorb the sunlight 106 and generate localized heating at the fluid-air interface. As a result, the local temperature increases and evaporates the fluid. The resulting vapor 114 escapes to the atmosphere, or can be captured for distillation purposes (e.g., converting salt water to freshwater, or converting contaminated water to potable water). As water proximal to upper surface 802 continuously evaporates, water from the bottom of evaporator 820 will simultaneously be pumped through evaporator 820, via vessels 302 and other natural interconnected channels in the wood. In particular, the negative pressure at the top of the evaporator induces capillary forces within the substrate channels that have smaller diameters than vessels, thereby moving fluid to the top 802 of the evaporator 820.

As noted above, in some embodiments, the natural wood may be subjected to partial delignification by treatment with a chemical solution. Such treatment can break some tracheid cell walls to form larger microchannels by connecting adjacent cell lumen 302, both vertically and tangentially, for potential transpiration of water. There also exist nanopores (i.e., nanochannels) between the aligned cellulose fibrils of cell walls due to the partial removal of hemicellulose and lignin, which can improve the water transpiration capability of the wood matrix through capillarity. Thus, fluid can be passively pumped to top heated surface 802 from the opposing bottom surface via capillary action and/or nano-cavitation effects.

A solar thermal device fabricated according to FIG. 8C was tested to assess its performance with respect to various metrics relevant to water extraction and desalination. In summary, the fabricated device of FIG. 8C demonstrated (1) 98% light absorption for wavelengths between 300 nm and 1200 nm; (2) ≥80% efficiency under 10 sun illumination (see FIG. 9B); (3) linear operation up to 10 suns (see FIG. 9A); and (4) stable operation without corrosion or solar degradation over multiple cycles (e.g., 20 cycles under 7 sun radiation).

In further embodiments of a wood-based solar thermal device, the direction of the lumen within the wood can be perpendicular to a direction of fluid flow through the evaporator. For example, FIG. 10A shows a wood-based evaporator 1000 formed of a block of natural wood that has been subject to a vertical cut, i.e., where wood is cut in a direction parallel to the tree growth direction 206, such that lumen 302 extend along a direction substantially parallel to top surface 1006 and/or bottom surface 1008. Accordingly, fluid 112 is transported via smaller pores (e.g., pits and/or spirals) between the lumen 302 (as well as any smaller diameter lumen (e.g., fiber tracheids) formed in interstitial region 304) from the bottom surface 1008, which is in contact with a fluid source, to top surface 1006, which receives and absorbs insolation 106. The fluid 112 is transported based on the capillary effect of the hydrophilic microstructures as well as any nano-cavitation effects resulting from evaporation 114 of fluid at top surface 1006.

Similar to the device of FIG. 4A, the top surface 1006 of evaporator 1000 can be coated to form a solar absorption region 1002, or can be modified to have a solar absorption region 1002. For example, the solar absorption region 1002 can be a carbonized portion of the natural wood. Alternatively or additionally, solar absorption region 1002 can comprise a coating of at least one of nanoparticles, nanowires, graphene, graphene oxide, reduced graphene oxide, graphite, single walled carbon nanotubes, double walled carbon nanotubes, multiwalled carbon nanotubes, polyaniline, carbon black, amorphous carbon, hard carbon, and soft carbon.

Figure 11A:
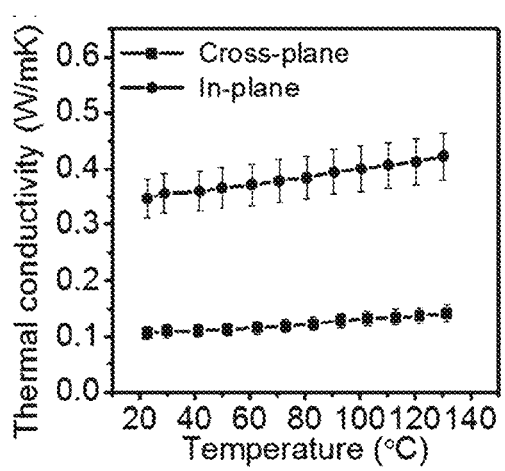
FIG. 11A is a graph of thermal conductivity of dry wood along (in-plane) and across (cross-plane) the tree growth direction.

Thus, the evaporator 1000 includes a region 1004 that is substantially natural wood (i.e., preserves the natural microstructure of the wood) while a region 1002 thereof has been modified to increase the solar absorption of the wood. Heating of region 1002 due to absorption of solar radiation causes evaporation of fluid at the top surface 1006. The natural wood region 1004 has a relatively low thermal conductivity. Moreover, the thermal conductivity in a cross-plane direction (i.e., perpendicular to the tree growth direction 206) is less than the thermal conductivity in an in-plane direction (i.e., along the tree growth direction 206), as shown in FIG. 11A. Some lumen 302 may at least partially contain air during operation and thus further improve the thermal insulation characteristics in the cross-plane direction. For example, the uppermost lumen 302, proximal to the top surface 1006, may be disposed above the fluid surface and thus least partially contain air during operation.

As a result, the evaporator 1000 of FIG. 10A may enjoy improved thermal isolation of region 1002 as compared to the evaporator 400 of FIG. 4A, thereby improving the vapor generation efficiency of the evaporator 1000. Indeed, the evaporator of FIG. 10A may enjoy higher efficiency and be more readily scalable than the evaporator of FIG. 4A.

Figure 11B:
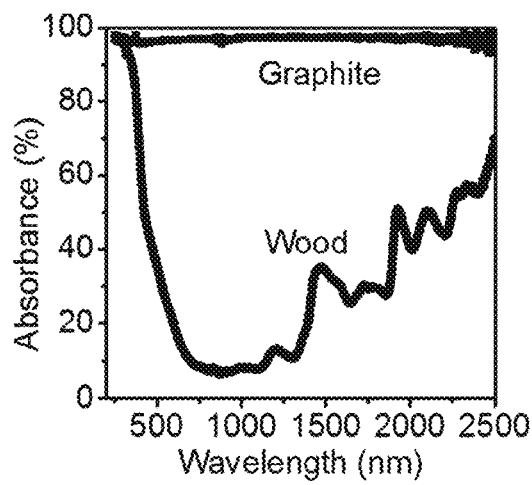
FIG. 11B is a graph of experimentally measured light absorption spectra for the fabricated wood-based evaporator of FIG. 10B (graphite) as compared to uncoated natural wood.

FIG. 10B shows an exemplary wood-based evaporator 1020 fabricated according to the principles of FIG. 10A for a water extraction, distillation, or desalination applications. The wood-based evaporator 1020 has a thin coating (e.g., ~50 μm) of graphite at top surface 1006 and a natural wood region 1004, as also illustrated in FIG. 10F. The graphite coating acts as an efficient solar radiation absorbing layer. Thus, evaporator 1020 can absorb sunlight more effectively than the natural wood layer, as suggested by FIG. 11B.

Additionally, the low thermal conductivity of the natural wood layer 1004 in the cross-plane direction (e.g., approximately 0.11 $Wm^{-1}K^{-1}$ versus 0.35 $Wm^{-1}K^{-1}$ in the in-plane direction) further reduces the heat dissipation from the top carbonized surface 1002, thereby concentrating the heating at the top surface 1006 for more efficient steam generation. Meanwhile, the relatively larger in-plane thermal conductivity allows the absorbed heat to be more readily conducted along the lumen 302, for example, to avoid hot spots and increase the amount of fluid converted to vapor.

Despite lumen 302 being oriented perpendicular to a direction of desired fluid flow, the natural wood layer 1004 still provides rapid and efficient water transport. As illustrated in FIGS. 10C-10E, smaller pores (e.g., ≤3 μm in diameter), such as pits 308 and/or nanoscale spirals 310, fluidically connect adjacent vessels 308 and/or fiber tracheids in interstitial region 304. The hydrophilic nature of the wood microstructures, coupled with capillary and any nano-cavitation effects, continue to pull water into wood block. The pits 308 and spirals 310 can serve as the backbone of the fluidic transport network in moving fluid through evaporator 1020 to its top surface 1006.

Figure 11C:
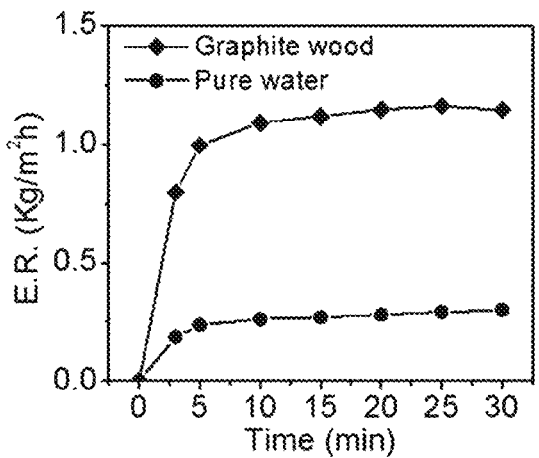
FIG. 11C is a graph of evaporation rate as a function of time for the fabricated wood-based evaporator of FIG. 10B during 1 sun illumination.
Figure 11D:
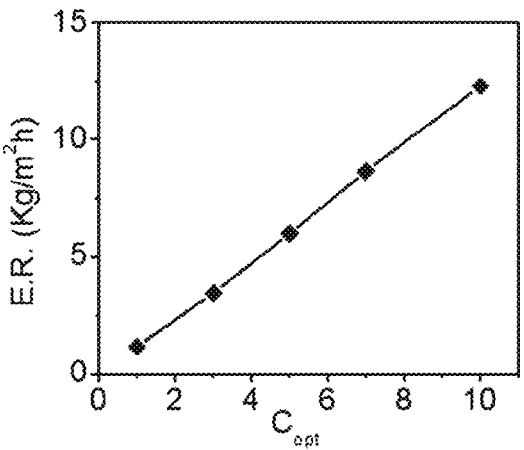
FIGS. 11D-11E are graphs of steam evaporation rate and steam generation efficiency for the fabricated wood-based evaporator of FIG. 10B as a function of different solar illumination intensities.
Figure 11E:
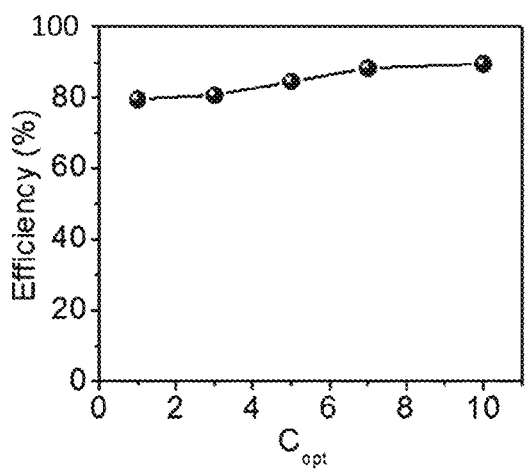

A solar thermal device fabricated according to FIG. 10B was tested to assess its performance with respect to various metrics relevant to water extraction and desalination. In summary, the fabricated device of FIG. 10B demonstrated (1) ≥95% light absorption for wavelengths between 200 nm and 2500 nm (see FIG. 11B); (2) ≥89% efficiency under 10 sun illumination (see FIG. 11E); and (3) linear operation up to 10 suns (see FIG. 11D). FIG. 11C illustrates the temporal response of evaporation of the solar thermal device fabricated according to FIG. 10B under 1 sun illumination conditions, where the solar thermal device results in a four-fold enhancement over pure water evaporation and a fast warm-up time (e.g., achieving 1 $kg\text{-}m^{-2}h^{-1}$ within 5 minutes of the start of irradiation).

Figure 12A:
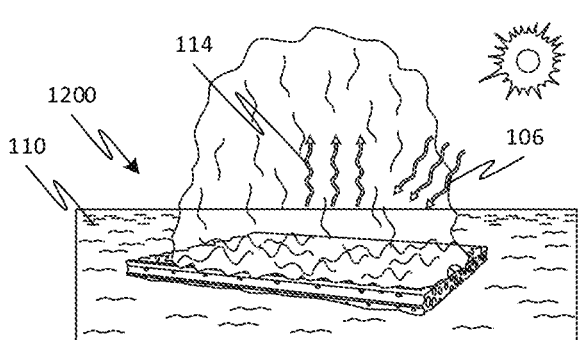
FIG. 12A is a simplified illustration of a wood-based evaporator according to FIG. 10A, employing carbonization of the wood as the solar absorption layer, according to one or more embodiments of the disclosed subject matter.
Figure 12B:
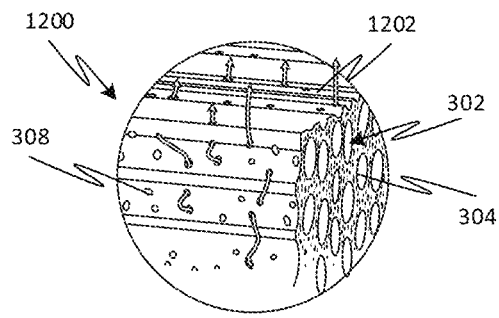
FIG. 12B is a close-up cutaway view of the wood-based evaporator of FIG. 12A.
Figure 12C:
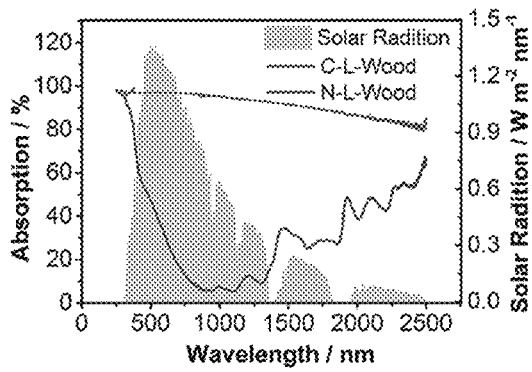
FIG. 12C is a graph of experimentally measured light absorption spectra for a wood-based evaporator of FIG. 12A (C-L Wood) as compared to uncoated natural wood having a vertical cut (N-L Wood).

FIGS. 12A-12B show another exemplary wood-based evaporator 1200 fabricated according to the principles of FIG. 10A for water extraction, distillation, or desalination applications. Instead of a graphite coating as in the evaporator 1020 of FIG. 10B, wood-based evaporator 1200 has a thin top layer 1202 (e.g., ~2 mm) that has been carbonized (i.e., carbon black). The carbonized top surface 1202 acts as an efficient solar radiation absorbing layer. Thus, evaporator 1200 can absorb sunlight more effectively than the natural wood layer, as suggested by FIG. 12C. The operation of the evaporator 1200 is otherwise similar to that of evaporator 1020 of FIG. 10B.

Figure 12D:
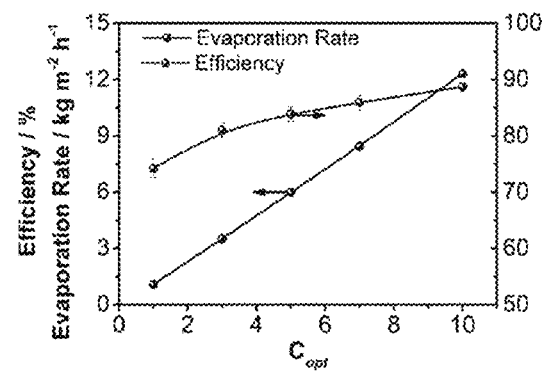
FIG. 12D is a graph of water evaporation rates and efficiencies of a wood-based evaporator of FIG. 12A as a function of different solar illumination intensities.

A solar thermal device fabricated according to FIGS. 12A-12B was tested to assess its performance with respect to various metrics relevant to water extraction and desalination. In summary, the fabricated device of FIGS. 12A-12B demonstrated (1) >95% light absorption over the full wavelength range of 300 nm and 2500 nm (see FIG. 12C); (2) >96% light absorption in a narrower wavelength range of 300-1400 nm, where solar radiation is mainly distributed (see FIG. 12C); (3) ≥89% efficiency under 10 sun illumination, where 1 Copt=1 $kW/m^2$ (see FIG. 12D); and (4) linear operation up to 10 suns (see FIG. 12D).

As noted above, when some embodiments of the wood-based evaporator are used in salt water applications with sufficiently high solar concentration, salt deposition can occur on the top surface of the wood-based evaporator. While such salt deposition does not normally affect device operation at sufficiently low solar concentrations (e.g., ≤5 sun), the deposition at higher solar concentrations may impede device performance. Moreover, higher evaporation rates can cause a gradient of salt concentration along the wood lumen, with the concentration being higher at the top surface than the bottom surface. The salt concentration or timing constraints of the solar cycle may further inhibit the self-regeneration ability described above. For example, evaporation rates that are too fast may suppress the back flow of salt solution in the wood channel, which will cause the enrichment of salt deposits at the solar absorption surface of the wood, thereby decreasing efficiency.

In some embodiments, the wood can be selected to have lumens (or modified to have holes) of sufficiently large size that allow for dilution of fluid. For example, FIGS. 13A-13D illustrate a wood-based evaporator where the wood has been selected to have naturally large lumen 1306. For example, the selected species of wood can be one of balsa, elm, and padauk. Nearly-saturated solution within fiber tracheids in the interstitial regions 1308 and/or at the top surface 1302 can be diluted by the convection flow through pores 1310 between the channels in the interstitial regions 1308 and the larger vessels 1306. As with other disclosed embodiments, the evaporator 1300 can include a top carbonized region 1302 that improves solar absorption and a natural wood region 1304 that transports fluid from a bottom surface 1312 to a top surface 1308 of the carbonized region 1302.

Figure 13A:
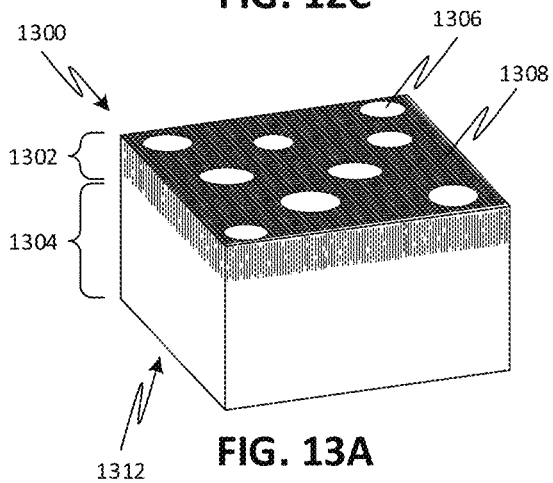
FIG. 13A is a simplified schematic of a wood-based evaporator, in a horizontal cut configuration with a carbonized layer as the solar absorption layer and naturally occurring pores that prevent salt accumulation, according to one or more embodiments of the disclosed subject matter.
Figure 13B:
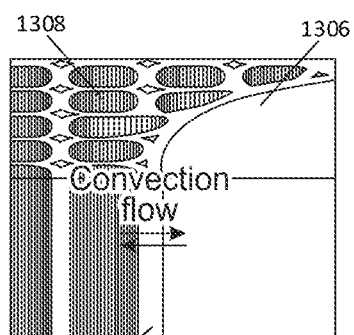
FIG. 13B is a close-up illustration of xylem lumen and pores of a wood-based evaporator according to FIG. 13A.
Figure 13C:
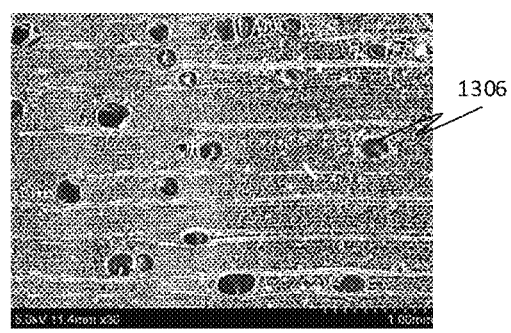
FIG. 13C is an SEM image of a top surface of a wood-based evaporator fabricated according to the structure of FIG. 13A.
Figure 13D:
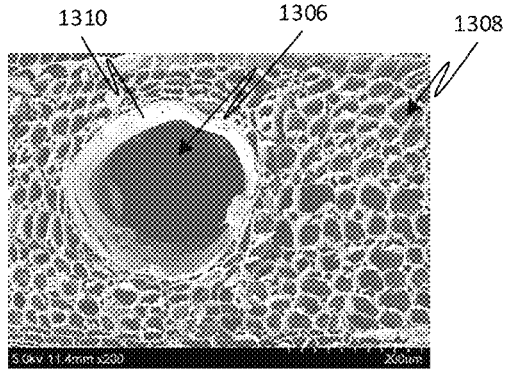
FIG. 13D is a close-up SEM image illustrating one of the pores of the wood-based evaporator of FIG. 13C.
Figure 14A:
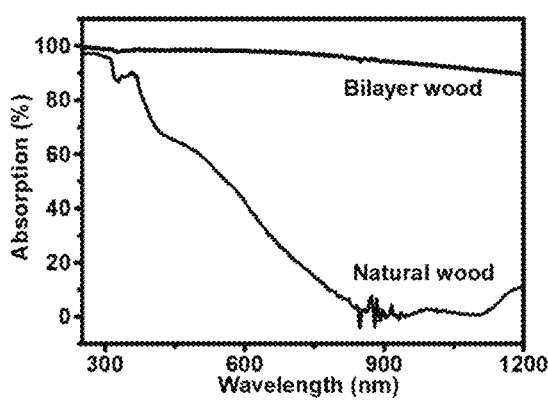
FIG. 14A is a graph of experimentally measured light absorption spectra for the fabricated wood-based evaporator of FIG. 13C (bilayer wood) as compared to uncoated natural wood.
Figure 14B:
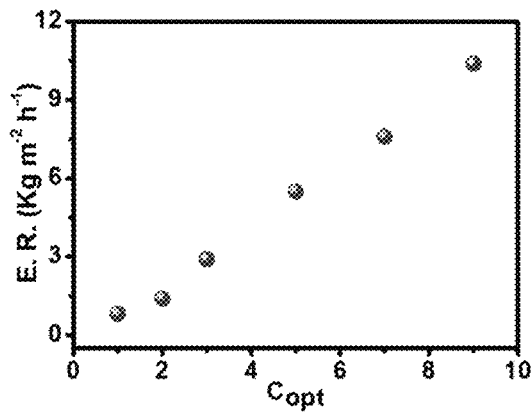
FIGS. 14B-14C are graphs of steam evaporation rate and steam generation efficiency for the fabricated wood-based evaporator of FIG. 13C as a function of different solar illumination intensities.
Figure 14C:
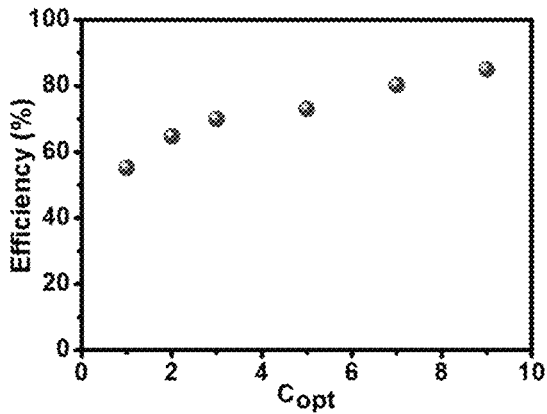

A solar thermal device fabricated according to FIG. 13A was tested to assess its performance with respect to various metrics relevant to water extraction and desalination. In summary, the fabricated device of FIG. 13A demonstrated (1) 99% light absorption (see FIG. 14A); (2) ≥85% efficiency under 10 sun illumination (see FIG. 14C); (3) linear operation up to 10 suns (see FIG. 14B); and (4) efficient operation (e.g., >75% efficiency) for water with salt concentration as high as 20 wt %.

Alternatively, or in addition to the wood selection features of FIG. 13A, the natural wood can be modified to have holes of sufficiently large size (e.g., 100 μm to 5 mm in diameter, inclusive) that allow for further dilution of fluid. For example, as shown in FIG. 4A, a wood-based evaporator 1500 can be formed of a block of natural wood that has been subject to a horizontal cut, such that lumen 1508 extend along a direction substantially perpendicular to top surface 1516 and/or bottom surface 1518. Accordingly, fluid 112 is transported by the lumen 1508 (as well as any smaller diameter lumen (e.g., fiber tracheids) formed in interstitial region 1510) from the bottom surface 1518, which is in contact with a fluid source, to top surface 1516, which receives and absorbs insolation 106. The fluid 112 is transported based on the capillary effect of the hydrophilic microstructures as well as any nano-cavitation effects resulting from evaporation 114 of fluid at top surface 1516.

As with previously described embodiments, the top surface 1516 of the evaporator 1500 can be coated to form a solar absorption region 1502, or can be modified to have a solar absorption region 1502. For example, the solar absorption region 1502 can be a carbonized portion of the natural wood. Alternatively or additionally, solar absorption region 1502 can comprise a coating of at least one of nanoparticles, nanowires, graphene, graphene oxide, reduced graphene oxide, graphite, single walled carbon nanotubes, double walled carbon nanotubes, multiwalled carbon nanotubes, polyaniline, carbon black, amorphous carbon, hard carbon, and soft carbon.

Thus, the evaporator 1500 includes a region 1504 that is substantially natural wood (i.e., preserves the natural microstructure of the wood) while a region 1502 thereof has been modified to increase the solar absorption of the wood. Heating of region 1502 due to absorption of solar radiation causes evaporation of fluid at the top surface 1516. The natural wood region 1504 has a relatively low thermal conductivity, and thus isolates the heating to region 1502, thereby improving the vapor generation efficiency of the evaporator 1500.

In addition to vessel lumen 1508, one or more artificial holes 1506 (e.g., formed by drilling, punching, or any other fabrication technique) can be formed in the wood so as to extend between top surface 1516 and bottom surface 1518. The artificial hole 1506 can have a larger size (e.g., 100 μm–5 mm in diameter) than that of the vessel lumen (e.g., <100 μm in diameter). Fluid 1512 from within lumens 1508 and/or smaller lumen within interstitial region 1510 can be transported into artificial hole 1506 so as to return to the bulk fluid. Similarly, any excess fluid at top surface 1516 can also return to the bulk fluid via artificial hole 1506.

Artificial holes 1506 can provide a region of relatively lower salt concentration, as compared to the salt concentrations within lumen 1508 and lumens within interstitial region 1510. As a result, a concentration convection flow between the artificial holes 1506 and the cell lumens can be established, which can dilute the salt solution in the channels prior to precipitation. This concentration convection flow may thus help to eliminate precipitation of salt within the cell lumen and/or on top surface 1516 of evaporator 1500.

Figure 15A:
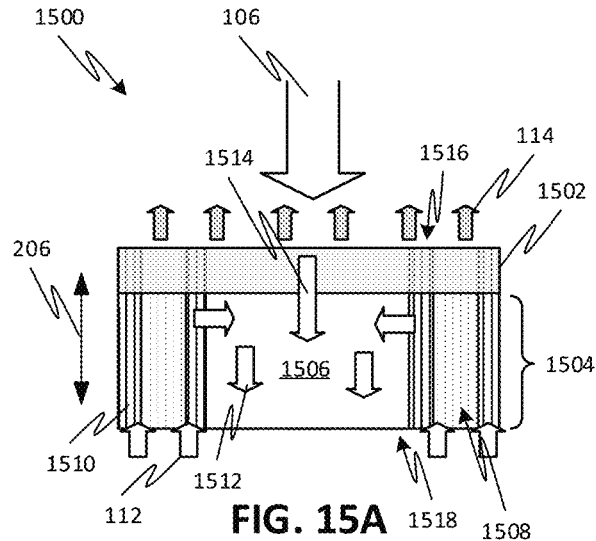
FIG. 15A is a simplified schematic of a wood-based evaporator, in a horizontal cut configuration with artificially introduced holes that prevent salt accumulation, according to one or more embodiments of the disclosed subject matter.

FIGS. 15B-15F shows an exemplary wood-based evaporator 1520 fabricated according to the principles of FIG. 15A for water extraction, distillation, or desalination applications. As with other disclosed embodiments, the evaporator 1520 can include a top carbonized region 1502 that improves solar absorption and a natural wood region 1504 that transports fluid from bottom surface 1518 to top surface 1516 of the carbonized region 1502.

Figure 15B:
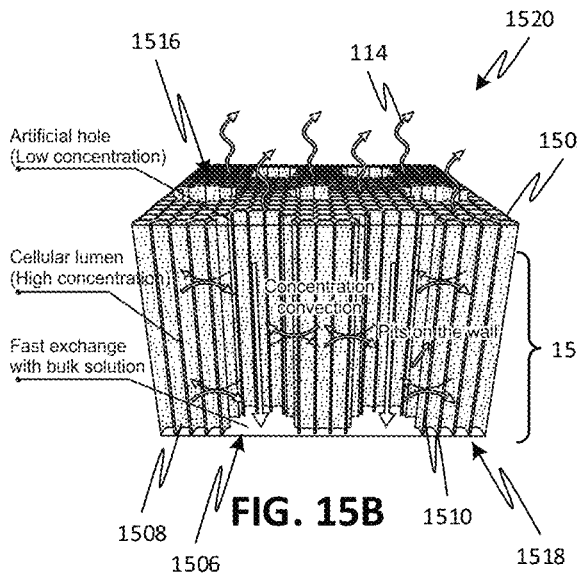
FIGS. 15B-15C are simplified cutaway and operational illustrations of a wood-based evaporator according to the structure of FIG. 15A, showing fluid recirculation features offered by artificial holes, according to one or more embodiments of the disclosed subject matter.
Figure 15C:
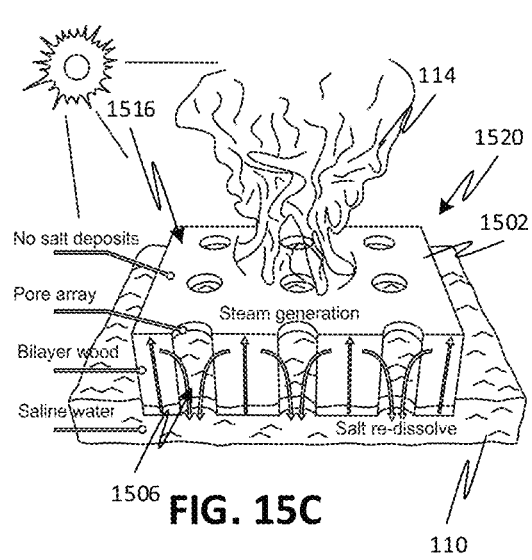
Figure 15D:
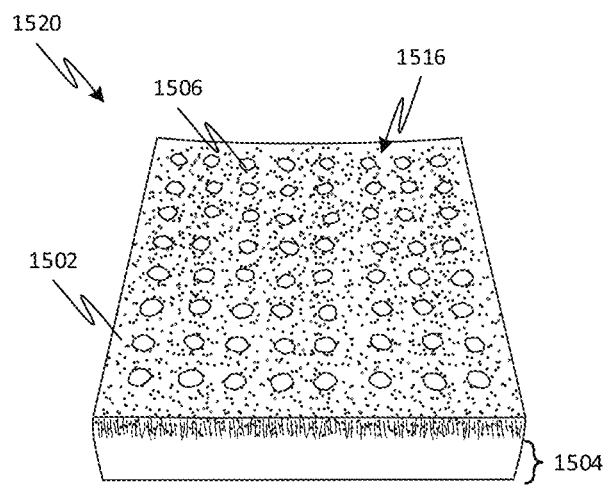
FIG. 15D is an image of a wood-based evaporator fabricated according to the structure of FIG. 15B.
Figure 15E:
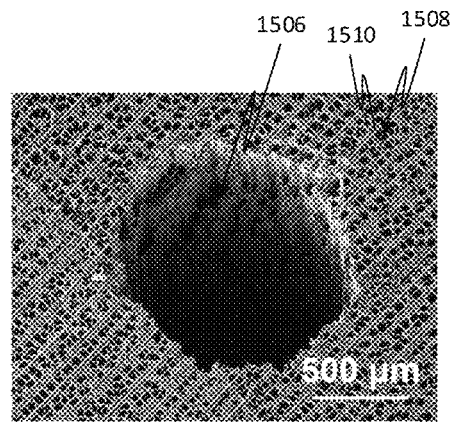
FIG. 15E is an SEM image of one of the artificial holes of the wood-based evaporator of FIG. 15D.
Figure 15F:
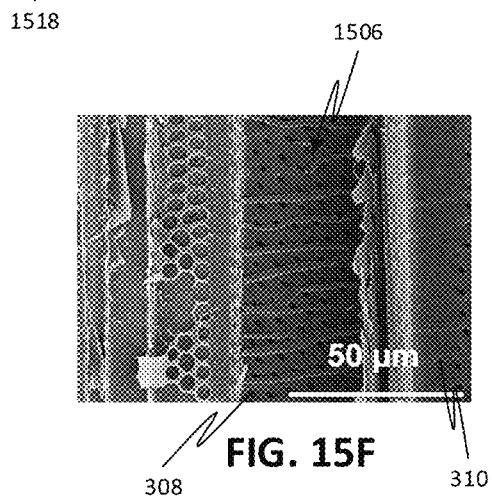
FIG. 15F is an SEM image of a cross-section of one of the artificial holes of the wood-based evaporator of FIG. 15D, illustrating pits and spirals connecting to adjacent lumen.
Figure 16A:
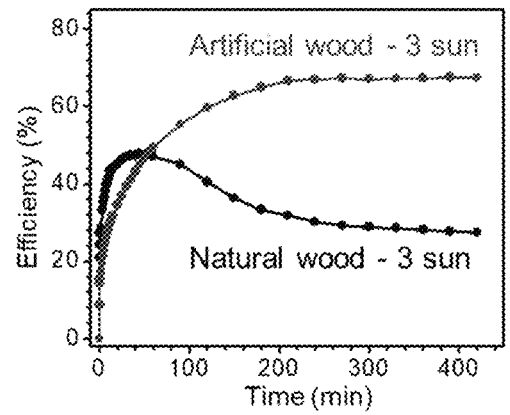
FIG. 16A is a graph of steam generation efficiency for the fabricated wood-based evaporator of FIG. 15D as a function of time, as compared to natural wood.
Figure 16B:
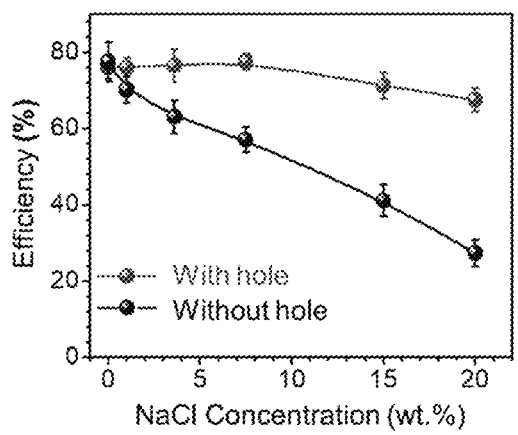
FIG. 16B is a graph of steam generation efficiency for the fabricated wood-based evaporator of FIG. 15D as a function of salt concentration, as compared to a wood-based evaporator without artificial holes.

A solar thermal device fabricated according to FIG. 15B was tested to assess its performance with respect to various metrics relevant to water extraction and desalination. In summary, the fabricated device of FIG. 15B demonstrated (1) an efficiency that did not decrease over time despite continuous operation in water with a high salt content (see FIG. 16A); and (2) an efficiency that exhibited only a mild decrease despite increasing salt content (see FIG. 16B). Indeed, the fabricated solar thermal device was able to operate at high efficiency (e.g., ≥70%) in salt concentrations of 20%.

Although the embodiments of FIG. 15A-15F have been illustrated using wood having a horizontal cut, embodiments of the disclosed subject matter are not limited thereto. Rather, in further embodiments of a wood-based solar thermal device, the direction of the lumen within the wood can be perpendicular to a direction of fluid flow through the evaporator, similar to FIG. 10A, and can include one or more artificial holes, similar to FIG. 15A.

Figure 17:
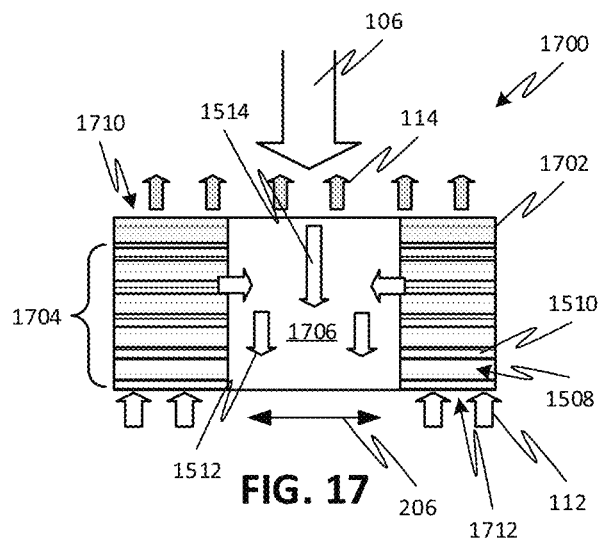
FIG. 17 is a simplified schematic of a wood-based evaporator, in a vertical cut configuration with artificial holes that prevent salt accumulation, according to one or more embodiments of the disclosed subject matter.

For example, FIG. 17 shows a wood-based evaporator 1700 formed of a block of natural wood that has been subject to a vertical cut, i.e., where wood is cut in a direction parallel to the tree growth direction 206, such that lumen 1508 extend along a direction substantially parallel to top surface 1710 and/or bottom surface 1712. Accordingly, fluid 112 is transported via smaller pores (e.g., pits and/or spirals) between lumen 1508 (as well as any smaller diameter lumen (e.g., fiber tracheids) formed in interstitial region 1510) from bottom surface 1712, which is in contact with a fluid source, to top surface 1710, which receives and absorbs insolation 106. The fluid 112 is transported based on the capillary effect of the hydrophilic microstructures as well as any nanocavitation effects resulting from evaporation 114 of fluid at top surface 1710.

Similar to the devices of FIG. 10A and FIG. 15A, top surface 1710 of evaporator 1700 can be coated to form a solar absorption region 1702, or can be modified to have a solar absorption region 1702. For example, the solar absorption region 1702 can be a carbonized portion of the natural wood. Alternatively or additionally, solar absorption region 1702 can comprise a coating of at least one of nanoparticles, nanowires, graphene, graphene oxide, reduced graphene oxide, graphite, single walled carbon nanotubes, double walled carbon nanotubes, multiwalled carbon nanotubes, polyaniline, carbon black, amorphous carbon, hard carbon, and soft carbon.

Thus, evaporator 1700 includes a region 1704 that is substantially natural wood (i.e., preserves the natural microstructure of the wood) while region 1702 thereof has been modified to increase the solar absorption of the wood. Heating of region 1702 due to absorption of solar radiation causes evaporation of fluid at top surface 1710. Moreover, as described above with respect to FIG. 10A, the orientation of lumen 1508 may contribute to improved thermal isolation of the top surface 1710, thereby improving the vapor generation efficiency of the evaporator 1000. In addition, the natural wood of evaporator 1700 can be modified to have artificial holes 1706 of sufficiently large size (e.g., 100 μm to 5 mm in diameter, inclusive) that allow for further dilution of fluid, with operational advantages similar to those described above with respect to FIG. 15A.

FIG. 18 illustrates a generalized process 1800 for use of a wood-based evaporator in a solar thermal application that utilizes generation of a vapor from fluid, such as, but not limited to fluid extraction, distillation, and desalination. The process 1800 can begin at 1802 where a wood-based evaporator is provided. In embodiments, any of the wood-based evaporators disclosed herein can be provided at 1802. Alternatively or additionally, 1802 can include the fabrication process 1900 of FIG. 19, which forms a wood-based evaporator.

The process 1800 can proceed to 1804, where the wood-based evaporator is placed in fluid communication with a fluid source, for example, by contacting a bottom surface of the wood-based evaporator with the fluid source. The fluid can be water or any other type of fluid, and the fluid source can be a body of the fluid (e.g., lake or ocean) or a ground material containing the fluid (e.g., soil or sand). In some embodiments, the wood-based evaporator can be constructed to float on the body of fluid, with the bottom surface within the body of fluid.

The process 1800 can proceed to simultaneous steps 1806, which include solar radiation exposure 1808, natural transport of fluid through the evaporator 1810, and optional transport of fluid back to the fluid source 1812. For example, 1808 can include exposing a top surface of the wood-based evaporator to insolation. The top surface can include a solar absorption coating or region that increase absorption of the insolation by the evaporator, thereby heating any fluid at the top surface of the evaporator. In some embodiments, the exposing 1808 can include concentrating the insolation, such that the solar radiation incident on the top surface of the evaporator is greater than 1 sun.

For example, 1810 can include transporting fluid from the bottom surface of the evaporator to the top surface of the evaporator via an internal fluidic transport network of the evaporator. In particular, the fluidic transport network is formed by microstructures of the natural wood of the evaporator. The fluidic transport network can naturally pump fluid through the network via capillary action and/or nano-cavitation effects.

For example, optional 1812 can include recirculating fluid from the top surface or within the fluidic transport network back to the bottom surface of the evaporator. In such optional configurations, the evaporator may include natural lumens having a diameter greater than or equal to 100 µm, or artificial holes having a diameter of 100 µm–5 mm. As discussed above, such recirculation can aid in eliminating, or at least reducing, salt deposits by providing a concentration convection flow between regions of high salt concentration (e.g., natural lumen having diameter <100 µm) and low salt concentration (e.g., natural lumen having diameters ≥100 µm or artificial holes). For example, during transport of the fluid between the top and bottom surfaces 1810/1812, a salinity can be lower in the artificial holes and/or natural lumens (>100 µm diameter) than other portions of the fluidic transport network (<100 µm diameter).

The process 1800 can proceed to 1814, where vapor emanating from the top surface of the wood-based evaporator is captured, and the captured vapor is condensed at 1816. The resulting condensed fluid may thus be considered distilled or desalinated with respect to the original fluid. Although shown as separate from simultaneous steps 1806, it is contemplated that the capturing 1814 and/or condensation 1816 may be concurrent with simultaneous steps 1806. Moreover, although illustrated separately, it is also possible for the capturing 1814 and condensation 1816 to happen simultaneously, for example, by using a structure that simultaneously captures and condenses, such as the structure 124 illustrated in FIG. 1B.

FIG. 19 illustrates a generalized process 1900 for forming a wood-based evaporator. The process 1900 can optionally begin at 1902, where a piece of natural wood is supplied, for example, by cutting from an existing tree or block of natural wood. The cut may be a horizontal cut (i.e., perpendicular to the tree growth direction), a vertical cut (i.e., parallel to the tree growth direction), or a cut in between a pure horizontal and pure vertical cut. For a horizontal cut, the wood has cellulose-based lumen extending along a tree growth direction that is parallel to at least one of top and bottom surfaces of the wood. For a vertical cut, the wood has cellulose-based lumen extending along a tree growth direction that is orthogonal to at least one of the top and bottom surfaces. For an intermediate cut (between horizontal and vertical), the wood has cellulose-based lumen extending a tree growth direction that is at a non-zero, non-orthogonal angle with respect to at least one of the top and bottom surfaces.

The natural wood can be any type of hardwood or softwood, such as, but not limited to, basswood, oak, poplar, ash, alder, aspen, balsa wood, beech, birch, cherry, butternut, chestnut, cocobolo, elm, hickory, maple, oak, padauk, plum, walnut, willow, yellow poplar, bald cypress, cedar, cypress, douglas fir, fir, hemlock, larch, pine, redwood, spruce, tamarack, juniper and yew. Selection of the natural wood may be based on desired porosity, density, mechanical strength, and/or lumen size for a particular solar thermal application. For example, in some applications, the density of the wood may be greater than that of the fluid, which would otherwise cause the evaporator to sink in a body of the fluid. Accordingly, wood for the evaporator may be selected so as to have a lower density than the fluid, so that it naturally floats in the body of fluid. In another example, selection of the wood for the evaporator may be based on the porosity and/or lumen size of the wood to provide a recirculating flow, as discussed above.

After the cutting 1902, the process 1900 proceeds to 1904, where it is determined if the wood should be chemically treated to at least partially remove lignin therefrom. The partial delignification may be used to increase a porosity of the wood and/or to increase a flexibility of the wood. If it is determined at 1904 that delignification is desirable, the process 1900 proceeds to 1906. Otherwise the process 1900 proceeds to 1908.

At 1906, the cut piece of natural wood is subjected to treatment with a chemical solution to partially (but not fully) remove lignin and/or hemicellulose therefrom. The treatment is such that between 5% and 95% of the lignin in the original natural wood has been removed, while retaining at least some of the cellulose of the natural wood. The piece of natural wood may be immersed in the chemical solution and subject to vacuum, so that the chemical solution can better infiltrate the structure and channels of the natural wood.

The chemical solution can include at least one of NaOH, $Na_2SO_3$, $(NH_4)_2SO_3$, p-TsOH, $NH_3.H_2O$, $NaOH+Na_2S$, $Na_2CO_3$, $NaOH+Na_2SO_3$, $NaOH+(NH_4)_2SO_3$, $NH_4OH+(NH_4)_2SO_3$, $NH_4OH+Na_2SO_3$, $NaOH+Na_2CO_3$, $NaOH+AQ$, $NaOH/Na_2S+AQ$, $NaOH+Na_2SO_3+AQ$, $Na_2SO_3+AQ$, $NaOH+Na_2S+Na_2S_m$, $Na_2SO_3+NaOH+CH_3OH+AQ$, $C_2H_5OH+NaOH$, $C_2H_8N_2$, $C_2H_7NO+NH_3—H_2O$, $N_2H_4-H_2O$, and $NaHCO_3$, where n in an integer and AQ is Anthraquinone. However, the mechanical properties of the treated wood substrate may depend on the pH of the chemical solution used for the treatment. In particular, solutions having a pH value greater than 7 may be used in order to produce a treated wood substrate with improved flexibility.

For example, NaOH can be used to selectively degrade lignin and hemicellulose in the wood materials while having little effect on the cellulose components. The addition of $Na_2SO_3$ can help further remove the lignin component and reduce the reaction time by increasing sulphite groups ($SO_3^{2-}$) in the lignin side chains via sulphonation, thereby allowing the lignin to more readily dissolve in alkaline solution. The interaction between the $NaOH/Na_2SO_3$ and cellulose, hemicellulose, and lignin molecules can also swell the cell wall, making it softer for subsequent manipulations (e.g., bending, folding, or twisting). Accordingly, in some embodiments, an aqueous solution of 2.5M NaOH and 0.4M of $Na_2SO_3$ mixed together can be used for as the chemical solution for the treatment of 1906, although other solution compositions selected from the above list or otherwise that satisfy the pH requirement are also contemplated for 1906.

After delignification 1906, or if it was determined that no delignification was necessary at 1904, the process 1900 can proceed to 1908, where it is determined if the wood should include artificial holes. The artificial holes may be used to provide recirculation features in the wood that mitigate the effects of salts in the fluid by allowing for a concentration convection flow. However, such artificial holes may be unnecessary if the evaporator will operate in a salt-free fluid, or if the evaporator will operate under lower insolation conditions (e.g., <5 suns) where intermittent periods of darkness allow the evaporator to naturally renew itself by continued pumping of fluid to remove accumulated salt deposits, or if the wood already has a sufficient number of large pores (e.g., ≥100 μm in diameter). If it is determined at 1908 that artificial holes are desirable, the process 1900 proceeds to 1910. Otherwise the process 1900 proceeds to 1912.

At 1910, one or more artificial holes are formed in the piece of wood. The artificial holes can extend from the top surface of the wood (e.g., the incident surface for solar radiation) to the bottom surface of the wood (e.g., the surface in contact with the fluid source). The artificial holes can have diameters of 100 μm to 5 mm. The artificial holes can extend straight through the thickness of the wood (i.e., with a direction of extension perpendicular to the top or bottom surface of the wood) or can be slanted (i.e., with a direction of extension at a nonorthogonal angle with respect to the top or bottom surface of the wood). The artificial holes can be formed by any known technique, including, but not limited to, drilling, punching, waterjet cutting, and laser cutting.

After forming artificial holes 1910, or if it was determined that no artificial holes were necessary at 1908, the process 1900 can proceed to 1912, where an optional surface preparation is performed. The optional surface preparation 1912 can prepare the top surface of the wood for formation of the solar absorption region in 1914. For example, the surface preparation 1912 can include cutting the wood to form a roughened top surface. Such roughened surface may have "flower-like" microsheets extending therefrom, for example, as described above with respect to FIGS. 8A-8D. Alternatively, surface preparation 1912 can include polishing the top surface to form a substantially flat surface in preparation for deposition of a radiation absorbing material.

The process 1900 can proceed to 1914, where a solar absorption layer or region is formed at the top surface of the wood. In some embodiments, 1914 includes coating to form a separate solar absorption layer on at least the top surface of the wood. For example, the coating can include at least one of nanoparticles, nanowires, graphene, graphene oxide, reduced graphene oxide, graphite, single walled CNTs, double walled CNTs, multiwalled CNTs, polyaniline, carbon black, amorphous carbon, hard carbon, and soft carbon.

When the coating comprises nanoparticles, the coating can be formed over most internal and external surfaces of the wood, rather than being isolated to a region at the top surface of the wood. The nanoparticles can include plasmonic metallic nanoparticles, such as Au, Pt, Pd, Ru, Fe, Co, Ni, Sn, or Mo. For example, to deposit Pd nanoparticles, the wood can be immersed in an aqueous solution of $PdCl_2$ (0.01 m) and heated at 80° C. In another example, to deposit Ag or Au nanoparticles, $Sn^{2+}$ can be used to reduce $Ag^+$ or $Au^{3+}$. The wood can be treated with 0.044 m $SnCl_2$ and then transferred to 0.01 m $AgNO_3$ or $HAuCl_4 \cdot 3H_2O$ under ultrasonic bath at room temperature. After 10 minutes, the Ag or Au nanoparticles can be deposited on the surface of the wood.

When the coating comprises graphite, the coating can be formed by flakes of graphite (e.g., having an average size of ~0.5 μm). For example, a spray-on graphite solution may be used to coat the top surface, where a uniform layer of the graphite flakes is formed after drying. When the coating comprises CNTs, the top surface of the wood can be immersed in an aqueous solution of the CNTs and then allowed to dry in air. Repeated immersions and dryings can be used to build up a layer of the CNTs on the top surface.

In some embodiments, 1914 includes forming a solar absorption region from a region of the wood proximal the top surface, for example, by carbonizing the top surface of the wood. For example, the carbonizing can include pressing the top surface of the wood into contact with a hot surface (e.g., 500° C.). The thickness of the carbonized solar absorption region can be controlled based on the amount of time the top surface remains in contact with the hot surface. For example, a 30-second contact time of the wood can result in a 3 mm thick carbonized region of the wood block.

After forming the solar absorption layer/region 1914, the process 1900 can proceed to 1916, where another optional surface preparation is performed. The optional surface preparation 1916 can adjust for any effects introduced by the formation of 1914. For example, the surface preparation 1916 can include polishing the carbonized solar absorption region (e.g., with 2000 grit sandpaper) and removing any residual or loose carbon (e.g., via compressed air).

The process 1900 can proceed to 1918, where the wood-based evaporator is assembled with other components into a solar thermal device. For example, the evaporator may be assembled with an optical system that directs or focuses solar radiation onto the top surface of the evaporator, a collector that collects vapor emanating from the evaporator, or a condenser that condenses vapor from the evaporator. The assembly may be such that the top surface of the evaporator will be exposed to radiation while the bottom surface (which is opposite the top surface) will be in contact with the fluid source.

It is noted that the order of 1902-1918 in the process of 1900 is meant to be exemplary only, and that other orders are also possible according to one or more contemplated embodiments. For example, the determination 1908 and formation of artificial holes 1910 may occur before determination 1904 and delignification 1906, or after surface preparation 1912, or after surface preparation 1916.

Embodiments of the disclosed subject matter also provide for scalability of the disclosed wood-based evaporators to provide processing of useful quantities of fluid. For example, by employing vertical cut configurations, large wood-sheets can be formed for the evaporator, thereby providing a large continuous area for solar radiation absorption and fluid processing. FIG. 20A illustrates a vertical cut fabrication setup 2000. The natural wood 2002 may be in the form of a log or cylindrical bar, with lumina extending in a direction perpendicular to the page. The natural wood 2002 can be cut using a rotary lathe 2004, for example, to separate a thin continuous layer 2006 of natural wood for subsequent processing. The natural wood layer 2006 can be conveyed to the next step 2008 in the fabrication process, e.g., forming solar absorption layer/region 2010, for example, by carbonization the wood surface by heating for 30 s at 500° C. or by coating the wood surface, as described above with respect to 1914 of process 1900, to form the final evaporator 2012.

FIG. 20B shows an exemplary setup 2020 according to the principles of FIG. 20A. The natural wood 2002 is cut along the wood growth direction 206, which is compatible with existing large-scale wood cutting processes (e.g., where a layer is peeled from the wood with a desired thickness and then pressed to yield a flat board). A spray 2028 can then be used to deposit a solar absorption layer 2032 (e.g., of 50 μm thickness) of graphite atop the natural wood 2034 (e.g., of 1.5 cm thickness) to form the final evaporator structure 2030.

Alternatively or additionally, scalability can be achieved by coupling together multiple separate wood-based evaporators, whether horizontal or vertical cut, into a single structure. For example, FIG. 21A illustrates an array 2100 of individual evaporator cells 2102 that have been coupled together using frame 2104, thereby allowing a larger solar absorption and fluid contact area. The frame 2104 can be formed of wood, which may be the same or different than the wood used to form the individual evaporator cells 2102, or of another insulating material. In some embodiments, the frame 2104 may only be provided around the border of the array 2100, without frame portions between adjacent evaporator cells 2102, in order to maximize the usable area. In other embodiments, the frame 2104 may be omitted, such that the evaporator cells 2102 are directly coupled to each other. FIG. 21B shows such an exemplary setup 2110, where the evaporator unit cells 2114 contact adjacent cells along their side faces.

Embodiments of the disclosed subject matter also provide for the temporary or permanent removal of substances or materials from the fluid, which materials may be adsorbed into the internal transport network formed by the natural lumen of the wood. As noted above, when the evaporator is operated in a fluid containing a salt, the salt can form on the top surface and within the transport network of the evaporator. By appropriate design of the evaporator, e.g., by selecting wood having a particular porosity, appropriate control of the operation of the evaporator (e.g., insolation level), and removing the evaporator from the fluid prior to renewal during night or low-insolation periods, salt may be removed from the fluid by the evaporator.

Figure 22A:
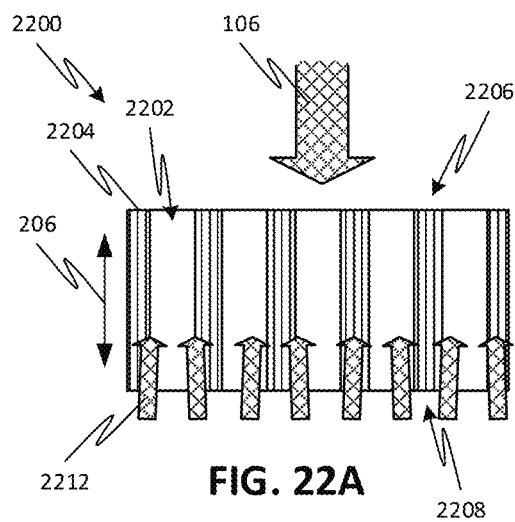
FIG. 22A is a simplified schematic of a wood-based thermal adsorber, in a horizontal cut configuration, according to one or more embodiments of the disclosed subject matter.

In alternative configurations, the wood for the solar thermal device can be specifically adapted to adsorption of a particular substance or material. For example, as shown in FIG. 22A, a wood-based adsorber 2200 can be formed of a block of natural wood that has been subject to a horizontal cut, i.e., where wood is cut in a direction perpendicular to the tree growth direction 206, such that lumen 2202 extend along a direction substantially perpendicular to top surface 2206 and/or bottom surface 2208. As with the evaporator embodiments, top surface 2206 receives and absorbs insolation 106, which heats the adsorber 2200. However, unlike some of the evaporator embodiments, the entirety of the adsorber 2200 may be subject to formation of the solar absorption coating/region. For example, the adsorber 2200 can be subjected to carbonization, such that all internal (e.g., surfaces of the cell lumen) and external (e.g., top 2206 and bottom 2208 surfaces) are carbonized, which may increase a porosity of the wood and/or convert surfaces from hydrophilic to hydrophobic while substantially maintaining the aligned channel structure of the natural wood.

Thus, heating due to solar radiation absorption is not isolated to the top surface 2206. Rather, the adsorber is heated throughout its thickness such that any material in contact with the bottom surface 2208 is also heated. This heating can increase a mobility of the material 2212, thereby allowing it to enter adsorber 2200. In particular, material 2212 can be transported via the capillary effect into the lumen 2202 (as well as any smaller diameter lumen (e.g., fiber tracheids) formed in the interstitial region between lumen 2202) from the bottom surface 2208, which is in contact with a source of the material (e.g., material disposed on a substrate or within a fluid).

Figure 22B:
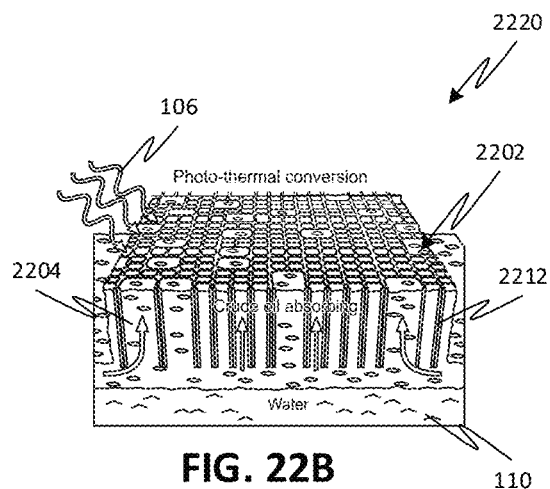
FIG. 22B is a simplified operational illustration of an exemplary thermal adsorber according to the generalized configuration of FIG. 22A to remove crude oil from water.
Figure 23A:
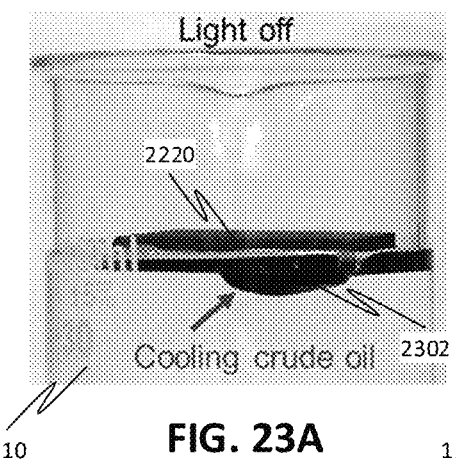
FIGS. 23A-23D are images of different stages in removal of crude oil from water using the wood-based thermal adsorber.
Figure 23B:
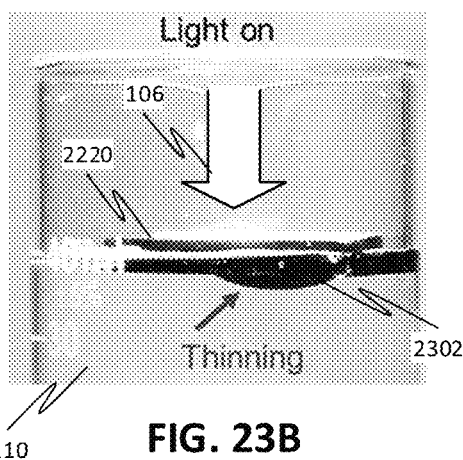
Figure 23C:
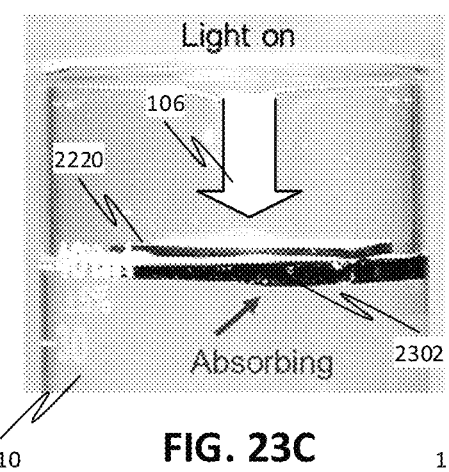
Figure 23D:
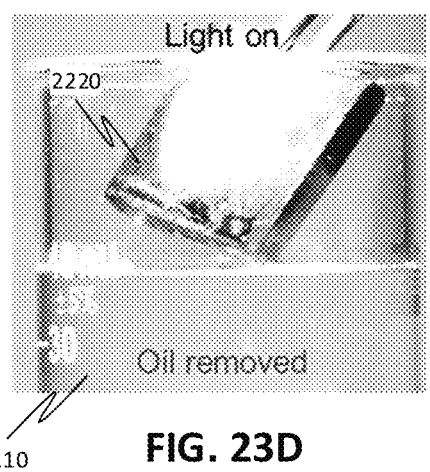

FIG. 22B shows an exemplary wood-based adsorber 2220 fabricated according to the principles of FIG. 22A for removing crude oil from water. FIGS. 23A-23D show operation of a fabricated device according to FIG. 22B to remove crude oil from water. The adsorber 2220, including top surface 2206, has been carbonized so as to increase absorption of solar radiation (e.g., >97% absorbance in the solar spectrum). As a result, the adsorber 2220 is heated by the radiation and also transmits heat to the crude oil 2302 in body of water 110.

Compared to light oil (e.g., having a viscosity less than 10 mPa.$), the cleaning of crude oil 2302 at room temperature can be difficult and relatively inefficient due to its high viscosity (i.e., over 1000 mPa.$). But the heating introduced by adsorber 2220 decreases surface tension, apparent viscosity, and/or dynamic contact angle of the crude oil 2302, thereby leading to significantly improved mobility of the crude oil 2302. This enhanced mobility, coupled with the internal microstructure of the wood, allows the crude oil to be pulled into adsorber 2220 by capillary action while leaving behind the fluid 110 due to the hydrophobic nature of the carbonized wood.

Figure 24:
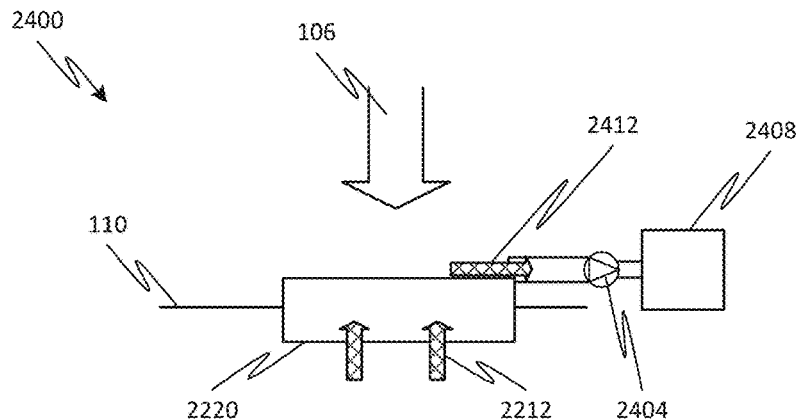
FIG. 24 is a simplified schematic of an exemplary solar thermal device with wood-based adsorber and a pump for periodic or continuous refreshing of the adsorber, according to one or more embodiments of the disclosed subject matter.

Thus, adsorber 2220 adsorbs the crude oil 2320 from water 110. Once adsorption of the crude oil 2302 is complete, or when the capacity of the adsorber 2220 has been reached, the adsorber 2220 can be removed from the water 110. Alternatively or additionally, the crude oil adsorbed into the wood microstructure can be continuously or periodically removed, thereby renewing the adsorber 2220 for removal of additional crude oil. For example, FIG. 24 illustrates a system 2400 including a pump 2404, which removes adsorbed material 2412 from the wood-based adsorber 2220 and stores it in container 2408. As a result, the system 2400 may be capable of longer duration or continuous operation.

Although not illustrated in FIGS. 22A-24, it is also possible for the wood-based adsorber to be formed of wood having a vertical cut configuration, similar to that of FIG. 10A but with all surfaces being carbonized or coated. However, in such configurations, one or more artificial holes may be provided, such as in FIG. 17, to aid the ingress of the material into the wood-based adsorber.

Figure 25:
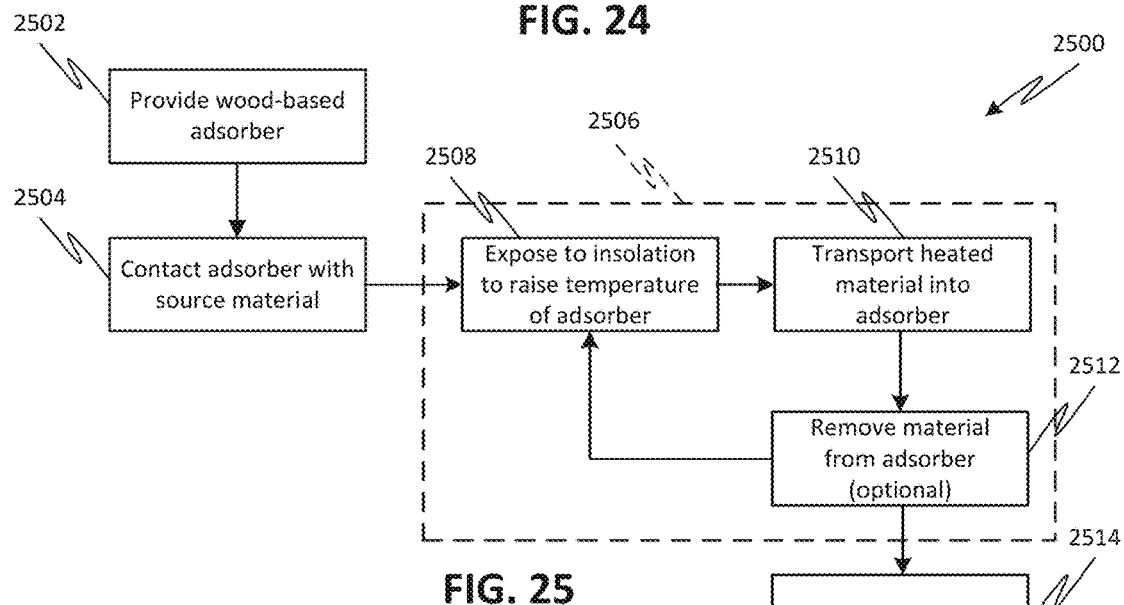
FIG. 25 is a process flow diagram for use of a wood-based adsorber for adsorption, according to one or more embodiments of the disclosed subject matter.

FIG. 25 illustrates a generalized process 2500 for use of a wood-based adsorber in a solar thermal application that utilizes heating to improve mobility of a material to be adsorbed, such as, but not limited to crude oil. The process 2500 can begin at 2502 where a wood-based adsorber is provided. In embodiments, any of the wood-based adsorbers disclosed herein (or a disclosed wood-based evaporator appropriately modified to be an adsorber) can be provided at 2502. Alternatively or additionally, 2502 can include the fabrication process 2600 of FIG. 26, which forms a wood-based adsorber.

The process 2500 can proceed to 2504, where the wood-based adsorber is placed into contact with a material to be adsorbed, for example, by contacting a bottom surface of the wood-based adsorber with a material floating in a fluid source. The material to be adsorbed can be crude oil or any other type of material, the fluid can be water or any other type of fluid, and the fluid source can be a body of the fluid (e.g., lake or ocean) or a ground material containing the fluid (e.g., soil or sand). In some embodiments, the wood-based adsorber can be constructed to float on the body of fluid, with the bottom surface contacting the material within the body of fluid.

The process 2500 can proceed to simultaneous steps 2506, which include solar radiation exposure 2508, transport of material into the adsorber 2510, and optional removal of material from the adsorber 2512. For example, 2508 can include exposing at least a top surface of the wood-based adsorber to insolation. The adsorber can include a solar absorption coating or region that increases absorption of the insolation by the adsorber, thereby heating the adsorber and any material in contact with the adsorber. In some embodiments, the exposing 2508 can include concentrating the insolation, such that the solar radiation incident on the adsorber is greater than 1 sun.

For example, 2510 can include transporting material from the bottom surface of the adsorber into the internal fluidic transport network of the adsorber. In particular, the fluidic transport network is formed by microstructures of the wood of the adsorber. In embodiments, the surfaces of the fluidic transport network have been coated or modified at a same time as the external surfaces (i.e., top surface). The coating or modification may cause the surfaces of the fluidic transport network to be converted from hydrophilic to hydrophobic, thereby resisting entry of fluid into the adsorber. At the same time, the heating by the adsorber increases a mobility of the material, thereby allowing the material to enter the fluidic transport network of the adsorber via capillary action.

For example, optional 2512 can include removing the adsorbed material from the adsorber. In such optional configurations, a pump may be provided to periodically or continuously remove the increased-mobility material from the internal fluidic transport network of the adsorber, thereby freeing space within the internal fluidic transport network for adsorption of additional material from the fluid source.

The process can proceed to 2514 when a period of no or reduced insolation occurs, when the adsorber has reached its adsorption capacity, or when there is no more material for adsorption. If adsorbed material has not been removed from the adsorber at 2512, then the removal of the adsorber at 2514 with adsorbed material therein effects removal of the material from the fluid source.

Figure 26:
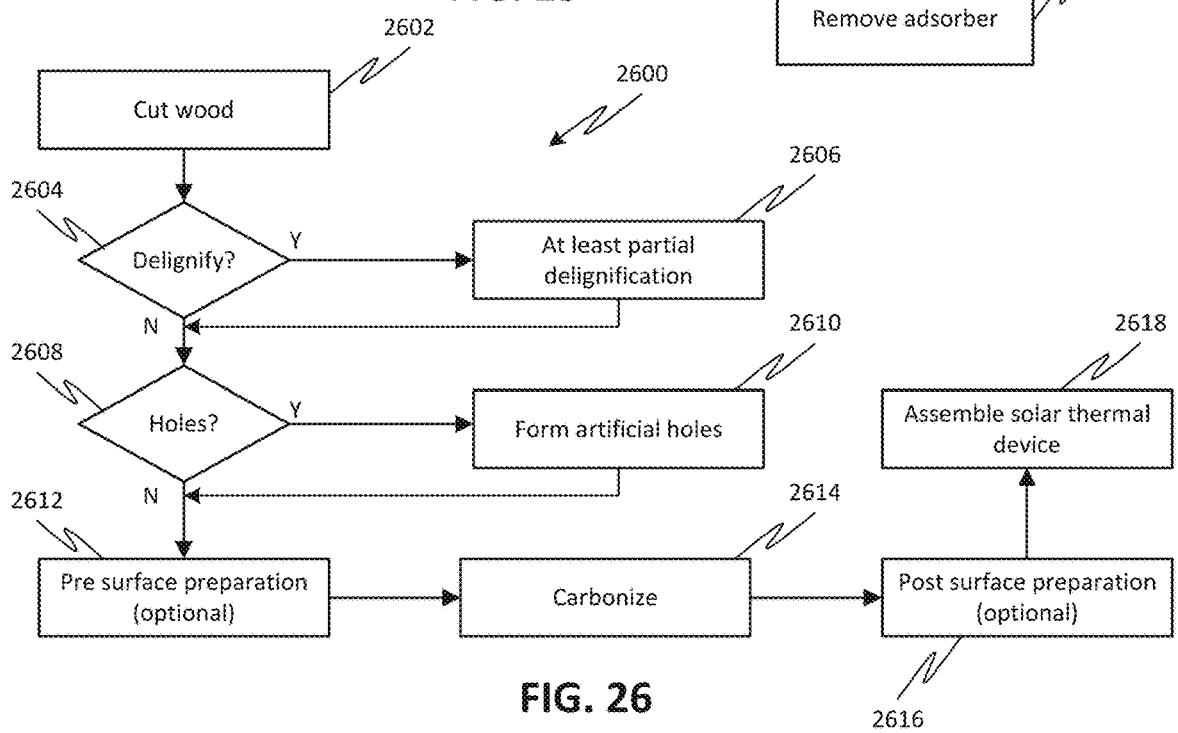
FIG. 26 is a process flow diagram for forming a wood-based adsorber or solar thermal device including the wood-based adsorber, according to one or more embodiments of the disclosed subject matter.

FIG. 26 illustrates a generalized process 2600 for forming a wood-based adsorber. The process 2600 can optionally begin at 2602, where a piece of natural wood is supplied, for example, by cutting from an existing tree or block of natural wood. The cut may be a horizontal cut (i.e., perpendicular to the tree growth direction), a vertical cut (i.e., parallel to the tree growth direction), or a cut between a pure horizontal and pure vertical cut. For a horizontal cut, the wood has cellulose-based lumen extending along a tree growth direction that is parallel to at least one of top and bottom surfaces of the wood. For a vertical cut, the wood has cellulose-based lumen extending along a tree growth direction that is orthogonal to at least one of the top and bottom surfaces. For an intermediate cut (between horizontal and vertical), the wood has cellulose-based lumen extending a tree growth direction that is at a non-zero, non-orthogonal angle with respect to at least one of the top and bottom surfaces.

The natural wood can be any type of hardwood or softwood, such as, but not limited to, basswood, oak, poplar, ash, alder, aspen, balsa wood, beech, birch, cherry, butternut, chestnut, cocobolo, elm, hickory, maple, oak, padauk, plum, walnut, willow, yellow poplar, bald cypress, cedar, cypress, douglas fir, fir, hemlock, larch, pine, redwood, spruce, tamarack, juniper and yew. Selection of the natural wood may be based on desired porosity, density, mechanical strength, and/or lumen size for a particular solar thermal application.

After the cutting 2602, the process 2600 proceeds to 2604, where it is determined if the wood should be chemically treated to at least partially remove lignin therefrom. If it is determined at 2604 that delignification is desirable, the process 2600 proceeds to 2606. At 2606, the cut piece of natural wood is subjected to treatment with a chemical solution to partially (but not fully) remove lignin and hemicellulose therefrom, for example, as described above with respect to FIG. 19. For example, delignification at 2606 may be used to increase porosity of the final adsorber, which may aid infiltration of the material into internal structures of the adsorber. Otherwise the process 2600 proceeds to 2608.

After delignification 2606, or if it was determined that no delignification was necessary at 2604, the process 2600 can proceed to 2608, where it is determined if the wood should include artificial holes. If it is determined at 2608 that artificial holes are desirable, the process 2600 proceeds to 2610. At 2610, one or more artificial holes are formed in the piece of wood, for example, as described above with respect to FIG. 19. The artificial holes may be used to increase a porosity of the wood, thereby aiding infiltration of the material into internal structures of adsorber. Otherwise the process 2600 proceeds to 2612.

After forming artificial holes 2610, or if it was determined that no artificial holes were necessary at 2608, the process 2600 can proceed to 2612, where an optional surface preparation is performed. The optional surface preparation 2612 can provide features that further enhance solar absorption. For example, the surface preparation 2612 can include cutting the wood to form a roughened top surface. Such roughened surface may have "flower-like" microsheets extending therefrom, for example, as described above with respect to FIGS. 8A-8D. Alternatively, surface preparation 2612 can include polishing the top surface to form a substantially flat surface.

The process 2600 can proceed to 2614, where the piece of wood is subjected to carbonization. In particular, the carbonization may be such that all (or at least most) internal (i.e., cell lumen) and external (i.e., top and bottom surfaces) surfaces of the wood are carbonized. The carbonized external surfaces can help improve absorption of the solar radiation, while the carbonized internal surfaces are converted from hydrophilic to hydrophobic, thereby resisting the infiltration of water into the adsorber. For example, the carbonizing can include heating the wood in hot furnace (e.g., $\geq 500°$ C.). The thickness of the carbonized regions can be controlled based on the amount of time the wood remains in the furnace.

Moreover, in some embodiments, the carbonization may be effective to at least partially decompose the cell walls, thereby increasing the porosity of the wood. For example, the porosity of the wood can increase from ~57% (with 28.2% being small pores (i.e., less than 20 μm, ~μm) and 29.2% being big pores (i.e., 20-70 μm, ~43 μm)) before carbonization to ~74% (with 38.1% being small pores and 35.7% being big pore) after carbonization. Optionally, further increases in porosity may be attained by introducing $CO_2$ activation during the carbonization.

After carbonization 2614, the process 2600 can proceed to 2616, where another optional surface preparation is performed. The optional surface preparation can adjust for any effects introduced by the carbonization 2614. For example, the surface preparation 2616 can include polishing at least the top surface of the adsorber (e.g., with 2000 grit sandpaper) and removing any residual or loose carbon (e.g., via compressed air).

The process 2600 can proceed to 2618, where the wood-based adsorber is assembled with other components into a solar thermal device. For example, the adsorber may be assembled with an optical system that directs or focuses solar radiation onto the top surface of the adsorber, a pump that extracts adsorbed material from the adsorber, and/or a container that stores the extracted material. The assembly may be such that the top surface of the adsorber will be exposed to radiation while the bottom surface (which is opposite the top surface) will be in contact with the to-be-adsorbed-material.

It is noted that the order of 2602-2618 in the process of 2600 is meant to be exemplary only, and that other orders are also possible according to one or more contemplated embodiments. For example, the determination 2608 and formation of artificial holes 2610 may occur before determination 2604 and delignification 2606, or after surface preparation 2612, or after surface preparation 2616.

Although the discussion above focuses on particular applications of the modified natural wood (e.g., as an evaporator for water and as an adsorber for crude oil), embodiments of the disclosed subject matter are not limited thereto. Rather, the modified natural wood can be applied to other fluids to be evaporated or other materials to be adsorbed, according to one or more contemplated embodiments.

Moreover, although the discussion above focuses on the use of solar radiation, embodiments of the disclosed subject matter are not limited thereto. Rather, radiation having different wavelength ranges from solar radiation could also be used, with the appropriate modification of the surface absorption layer/region, according to one or more contemplated embodiments.

Embodiments of the enclosed subject matter can include a natural wood material with at least a top surface having been modified by at least one of surface carbonization to form carbon black, and coating with graphite, carbon nanotubes (CNTs), metallic particles (e.g., plasmonic nanoparticles), nonmetallic particles, polymer, and/or light absorbing materials (e.g., carbon black, graphene, metal oxide, etc.). The type of wood can be any type of hardwood or softwood, and may be selected based on porosity, cost, density, weight, application or any other characteristic. For example, in those applications where it is desirable to avoid salt accumulation, the wood may be balsa elm, padauk, or any other wood having naturally formed lumina of at least 100 μm in diameter.

Moreover, in any of the disclosed embodiments, the wood may be chemically modified. For example, the wood may be subjected to partial delignification in order to increase porosity or flexibility of the wood. Alternatively or additionally, the wood can be chemically treated to alter its hydrophilicity (e.g., increase hydrophilicity or increase hydrophobicity) and/or solar energy absorptivity.

As noted above, the wood may be vertical cut (i.e., cut along the tree growth direction, such that the solar absorption surface is substantially parallel to a direction of extension of the lumen), horizontal cut (i.e., cut perpendicular to the tree growth direction, such that the solar absorption surface is substantially perpendicular to a direction of extension of the lumen), or an angled cut (i.e., in between horizontal and vertical cuts, where the solar absorption surface is at a non-zero, non-orthogonal angle with respect to a direction of extension of the lumen).

Moreover, although particular wood shapes have been discussed herein, embodiments of the disclosed subject matter are not limited thereto. Other shapes, such as but not limited to bar, sheet, thin film, and rod, are also possible according to one or more contemplated embodiments. In addition, the wood can be formed of composite layers of individual wood shapes. For example, embodiments of the disclosed subject matter can be formed of plywood (i.e., sheet with thin layers of wood plies) or other types of wood board with a well-defined internal fluidic transport network.

Indeed, although the term "block" has been used extensively herein, "block" is not intended to be limiting to any particular shape or configuration of wood. Rather, where "block" of wood is specified, any shape of wood would apply, including, but not limited to a thin sheet (e.g., having a thickness less than or equal to 5 mm).

In this application, unless specifically stated otherwise, the use of the singular includes the plural, and the separate use of "or" and "and" includes the other, i.e., "and/or." Furthermore, use of the terms "including" or "having," as well as other forms such as "includes," "included," "has," or "had," are intended to have the same effect as "comprising" and thus should not be understood as limiting.

In this application, the terms "horizontal" and "vertical" have been used to define particular cut directions (i.e., perpendicular to the tree growth direction and parallel to the tree growth direction, respectively) or to describe the relative locations of different components of the disclosed embodiments. However, the embodiments are not limited to strictly horizontal and vertical directions. Where such descriptive terms are used, they are to include deviations therefrom. For example, "horizontal" can include directions that have a minor vertical component (e.g., up to 10%) and "vertical" can include directions that have a minor horizontal component (e.g., up to 10%).

Moreover, the terms "horizontal," "vertical," "top," "bottom," and "side" have been used herein for convenience to described relative orientations of components and are not intended to limit an arrangement of the wood with respect to gravity. Indeed, it is contemplated that in some embodiments of the disclosed subject matter, the vertical direction may extend perpendicular to the direction of gravity and the horizontal direction may extend parallel to the direction of gravity.

Any range described herein is intended to include the endpoints and all values between the endpoints. Whenever "substantially," "approximately," "essentially," "near," or similar language is used in combination with a specific value, variations up to and including 10% of that value are intended, unless explicitly stated otherwise.

The foregoing descriptions apply, in some cases, to examples generated in a laboratory, but these examples can be extended to production techniques. Thus, where quantities and techniques apply to the laboratory examples, they should not be understood as limiting. In particular, where specific chemicals or materials have been disclosed herein, other chemicals and materials may also be employed according to one or more contemplated embodiments.

It is thus apparent that there is provided in accordance with the present disclosure, wood-based solar thermal devices, and methods for fabrication and use thereof. Many alternatives, modifications, and variations are enabled by the present disclosure. While specific examples have been shown and described in detail to illustrate the application of the principles of the present invention, it will be understood that the invention may be embodied otherwise without departing from such principles. For example, disclosed features may be combined, rearranged, omitted, etc. to produce additional embodiments, while certain disclosed features may sometimes be used to advantage without a corresponding use of other features. Accordingly, Applicant intends to embrace all such alternative, modifications, equivalents, and variations that are within the spirit and scope of the present invention.

The invention claimed is:

1. A method of removing crude oil from a body of water, the method comprising:
  (a) providing a carbonized block of natural or lignin-reduced wood having a first surface, a second surface opposite the first surface, and an internal fluidic transport network formed by lumen of the natural or lignin-reduced wood extending between the first and second surfaces, the carbonized block having a porosity greater than that of the natural or lignin-reduced wood, all internal and external surfaces of the carbonized block being carbonized so as to be hydrophobic;
(b) placing the second surface of the carbonized block in contact with the crude oil in the body of water; and
(c) exposing the first surface to insolation so as to heat the carbonized block,
wherein, during (c), the carbonized block heats the crude oil contacting the second surface such that the crude oil has a mobility greater than that of the crude oil prior to (c), and
the carbonized block adsorbs the heated crude oil into the lumen of the internal fluidic transport network via capillary action, while leaving behind the water due to the hydrophobic surfaces of the carbonized block, so as to remove the crude oil from the body of water.

2. The method of claim 1, further comprising (d) removing the adsorbed heated crude oil from the carbonized block.

3. The method of claim 2, wherein (c) and (d) occur simultaneously, such that the adsorbed heated crude oil is continuously removed from the carbonized block during insolation.

4. The method of claim 1, wherein the carbonized block has a lignin content less than that of the natural wood.

5. The method of claim 1, wherein, prior to (c), the crude oil has a viscosity greater than 1000 mPa·s.

6. The method of claim 1, wherein (c) comprises concentrating the insolation such that solar radiation incident on the first surface is greater than 1 sun.

7. The method of claim 2, wherein the removing comprises pumping the adsorbed heated crude oil out of the internal fluidic transport network via a portion of the first surface.

8. The method of claim 1, wherein the porosity of the carbonized block is greater than 57%.

* * * * *